United States Patent [19]

Ovshinsky et al.

[11] Patent Number: 4,727,000
[45] Date of Patent: Feb. 23, 1988

[54] X-RAY DISPERSIVE AND REFLECTIVE STRUCTURES

[75] Inventors: Stanford R. Ovshinsky; John Keem, both of Bloomfield Hills; Steven A. Flessa, Southfield; James L. Wood, Westland; Keith L. Hart, Flat Rock; Lennard Sztaba, Hamtramck, all of Mich.

[73] Assignee: Ovonic Synthetic Materials Co., Inc., Troy, Mich.

[21] Appl. No.: 876,292

[22] Filed: Jun. 18, 1986

Related U.S. Application Data

[63] Continuation-in-part of Ser. No. 501,659, Jun. 6, 1983, abandoned.

[51] Int. Cl.$^4$ .................. G21K 1/06; B32B 15/04
[52] U.S. Cl. .................. 428/635; 428/457; 428/615; 428/641; 428/649; 428/660; 428/663; 428/665; 428/666; 428/668; 428/670; 428/674; 428/680; 428/681; 378/84
[58] Field of Search .......... 378/84; 350/166, 397, 350/1.7; 428/635, 666, 615, 641, 665, 660, 661, 649, 662, 663, 670, 686, 674, 680, 681, 668, 704, 687, 457, 688, 333, 612

[56] References Cited

U.S. PATENT DOCUMENTS

| | | | |
|---|---|---|---|
| 3,271,179 | 9/1966 | Smith, Jr. ................ | 350/166 |
| 3,479,156 | 11/1969 | Ginder ..................... | 428/635 |
| 3,756,788 | 9/1973 | Whetstone ............... | 428/661 |
| 4,261,771 | 4/1981 | Dingle et al. ............. | 357/4 |
| 4,448,854 | 5/1984 | Schuller et al. .......... | 428/635 |
| 4,522,890 | 6/1985 | Volkers et al. ........... | 428/635 |
| 4,564,564 | 1/1986 | Schuller et al. .......... | 428/662 |
| 4,587,176 | 5/1986 | Carcia ...................... | 428/615 |

OTHER PUBLICATIONS

K. Y. Ahn, "Multilayer Ground Plane Fabrication", IBM Technical Disclosure Bulletin, vol. 11, No. 11, Apr. 1967, pp. 1596–1597.
Compton, A. H., *X-Rays and Electrons*, Van Nostrand Company, New York, 1926, pp. 36 and 37, 205.
*Handbook of Chemistry and Physics*, Chemical Rubber Publishing Co., 1974, pp. F-200 and F-201.
Pauling, L., *The Nature of the Chemical Bond*, 3rd Edition, Cornell University Press, Ithica, N.Y., 1960, pp. 91–95.
Grigorovici, R., "Amorphous Semiconducting Films: Physical Background and Applications", *Proc. Int. Conf. on Thin Films vol. I*, Venice, Italy, 1972, pp. 153–155.
Spiller, et al., Evaporated Multilayer Dispersion Elements for Soft X-Rays, 1981, pp. 124–130.
Spiller, et al., Controlled Fabrication of Multilayer Soft X-Ray Mirrors, 1980, pp. 1048–1050.
Underwood, et al., Synthetic Multilayers as Bragg Diffractors for X-Rays, 1981, pp. 170–178.
Underwood, et al., Layered Synthetic Microstructures: Properties and Applications in X-Ray Astronomy, 1979, pp. 123–130.
Haelbich, et al., Smooth-Multilayer Films Suitable for X-Ray Mirrors, 1979, pp. 184–186.
Schuller, New Class of Layered Materials, Jun. 16, 1980, pp. 1597–1600.

*Primary Examiner*—John J. Zimmerman
*Attorney, Agent, or Firm*—Richard M. Goldman; Marvin S. Siskind

[57] ABSTRACT

X-ray dispersive and reflective structures and materials are provided which exhibit at least one third of the theoretical integral reflection coefficient for the structures in the range of interest without fluorescence or absorption edges. The materials can be thermally activated to control the desired properties, during or post deposition. The structures can be deposited by ion beam absorption techniques to form the structures in a precise manner. The index of the refraction of the structures can be continuously varying throughout the structures.

11 Claims, 20 Drawing Figures

ELECTRONEGATIVITIES OF THE ELEMENTS (SOURCE: PAULING, <u>THE NATURE OF THE CHEMICAL BOND</u>, (1960) TABLE 3-8)

| H 2.1 | | | | | | | | | | | | | | | | | He |
|---|---|---|---|---|---|---|---|---|---|---|---|---|---|---|---|---|---|
| Li 1.0 | Be 1.5 | | | | | | | | | | | B 2.0 | C 2.5 | N 3.0 | O 3.5 | F 4.0 | Ne |
| Na 0.9 | Mg 1.2 | | | | | | | | | | | Al 1.5 | Si 1.8 | P 2.1 | S 2.5 | Cl 3.0 | Ar |
| K 0.5 | Ca 1.0 | Sc 1.3 | Ti 1.5 | V 1.6 | Cr 1.6 | Mn 1.5 | Fe 1.8 | Co 1.8 | Ni 1.8 | Cu 1.9 | Zn 1.6 | Ga 1.6 | Ge 1.8 | As 2.0 | Se 2.4 | Br 2.5 | Kr |
| Rb 0.7 | Sr 1.0 | Y 1.2 | Zr 1.4 | Nb 1.6 | Mo 1.8 | Tc 1.9 | Ru 2.2 | Rh 2.2 | Pd 2.2 | Ag 1.9 | Cd 1.7 | In 1.7 | Sn 1.8 | Sb 1.9 | Te 2.1 | I 2.5 | Xe |
| Cs 0.7 | Ba 0.9 | La 1.2 | Hf 1.3 | Ta 1.5 | W 1.7 | Re 1.9 | Os 2.2 | Ir 2.2 | Pt 2.2 | Au 2.4 | Hg 1.9 | Tl 1.8 | Pb 1.8 | Bi 1.9 | Po 2.0 | At 2.2 | Rn |

FIG. 12

ATOMIC RADII OF THE ELEMENTS (A°)

(SOURCE: TABLE OF PERIODIC PROPERTIES OF ELEMENTS SARGENT – WELCH SCIENTIFIC CO. SKOKIE TL, CATALOG #3 – 18806)

| H 0.79 | | | | | | | | | | | | | | | | | He 0.49 |
|---|---|---|---|---|---|---|---|---|---|---|---|---|---|---|---|---|---|
| Li 2.05 | Be 1.40 | | | | | | | | | | | B 1.17 | C 0.91 | N 0.75 | O 0.67 | F 0.57 | Ne 0.51 |
| Na 2.23 | Mg 1.72 | | | | | | | | | | | Al 1.82 | Si 1.46 | P 1.23 | S 1.09 | Cl 0.97 | Ar 0.88 |
| K 2.77 | Ca 2.23 | Sc 2.09 | Ti 2.00 | V 1.92 | Cr 1.85 | Mn 1.79 | Fe 1.72 | Co 1.67 | Ni 1.62 | Cu 1.57 | Zn 1.53 | Ga 1.81 | Ge 1.52 | As 1.33 | Se 1.22 | Br 1.12 | Kr 1.03 |
| Rb 2.98 | Sr 2.45 | Y 2.27 | Zr 2.16 | Nb 2.08 | Mo 2.01 | Tc 1.95 | Ru 1.89 | Rh 1.83 | Pd 1.79 | Ag 1.75 | Cd 1.71 | In 2.00 | Sn 1.72 | Sb 1.53 | Te 1.42 | I 1.32 | Xe 1.24 |
| Cs 3.34 | Ba 2.78 | La 2.74 | Hf 2.16 | Ta 2.09 | W 2.02 | Re 1.97 | Os 1.92 | Ir 1.87 | Pt 1.83 | Au 1.79 | Hg 1.76 | Tl 2.08 | Pb 1.81 | Bi 1.63 | Po 1.53 | At 1.43 | Rn 1.34 |

FIG. 13

BOND LENGTHS OF THE ELEMENTS (SOURCE: HANDBOOK OF CHEMISTRY & PHYSICS (1974, Pg. F-201))

| H 0.74 | | | | | | | | | | | | | | | | | He |
|---|---|---|---|---|---|---|---|---|---|---|---|---|---|---|---|---|---|
| Li 3.04 | Be 2.23 | | | | | | | | | | | B 1.59 | C 1.54 | N 1.10 | O 1.21 | F 1.42 | Ne |
| Na 3.72 | Mg 2.73 | | | | | | | | | | | Al 2.86 | Si 2.35 | P 2.21 | S 1.89 | Cl 1.99 | Ar |
| K 4.54 | Ca 3.95 | Sc 3.21 | Ti 2.90 | V 2.62 | Cr 2.50 | Mn 2.73 | Fe 2.48 | Co 2.51 | Ni 2.49 | Cu 2.56 | Zn 2.67 | Ga 2.44 | Ge 2.45 | As 2.49 | Se 2.32 | Br 2.29 | Kr |
| Rb 4.95 | Sr 4.30 | Y 3.55 | Zr 3.18 | Nb 2.86 | Mo 2.73 | Tc 2.70 | Ru 2.65 | Rh 2.69 | Pd 2.75 | Ag 2.89 | Cd 2.98 | In 3.25 | Sn 2.81 | Sb 2.90 | Te 2.86 | I 2.66 | Xe |
| Cs 5.31 | Ba 4.35 | La 3.74 | Hf 3.13 | Ta 2.86 | W 2.74 | Re 2.74 | Os 2.68 | Ir 2.71 | Pt 2.75 | Au 2.88 | Hg 3.00 | Tl 3.41 | Pb 3.50 | Bi 3.09 | Po 3.35 | At | Rn |

FIG. 14

TABLE OF DELTA AND BETA COEFFICIENTS WITH Cu-kα X-RAYS — FIG. 15

FOR SELECTED ELEMENTS AND COMPOSITIONS

B₄C: .73 E-5, .007 E-6

| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| H | | | | | | | | | | | | | | | | | He |
| Li | Be | | | | | | | | | | | B .70 E-5 .005 E-6 | C .84 E-5 .01 E-6 | N | O | F | Ne |
| Na | Mg .55 E-5 .08 E-6 | | | | | | | | | | | Al | Si .75 E-5 .17 E-6 | P | S | Cl | Ar |
| K | Ca | Sc | Ti 1.33 E-5 1.13 E-6 | V 1.69 E-5 1.61 E-6 | Cr 2.14 E-5 2.18 E-6 | Mn 2.45 E-5 2.7 E-6 | Fe 2.36 E-5 2.91 E-6 | Co 2.63 E-5 3.17 E-6 | Ni 2.74 E-5 .51 E-6 | Cu 2.64 E-5 .56 E-6 | Zn | Ga | Ge | As | Se | Br | Kr |
| Rb | Sr | Y | Zr | Nb 2.4 E-5 1.5 E-6 | Mo 2.9 E-5 1.9 E-6 | Tc | Ru | Rh | Pd | Ag | Cd | In | Sn | Sb | Te | I | Xe |
| Cs | Ba | La | Hf 3.4 E-5 2.6 E-6 | Ta 4.3 E-5 3.4 E-6 | W 5.0 E-5 4.1 E-6 | Re 5.5 E-5 4.7 E-6 | Os | Ir | Pt 5.5 E-5 5.4 E-6 | Au | Hg | Tl | Pb | Bi | Po | At | Rn |

TABLE OF DELTA AND BETA COEFFICIENTS WITH Al-kα X-RAYS

FIG. 16

FOR SELECTED ELEMENTS AND COMPOSITIONS

| H | | | | | | | | | | | | | | | | | He |
|---|---|---|---|---|---|---|---|---|---|---|---|---|---|---|---|---|---|
| Li | Be | | | | | | | | | | | B 2.1 E-4 .06 E-4 | C 2.6 E-4 .1 E-4 | N | O | F | Ne |
| Na Mg 1.43 E-4 .5 E-4 | | | | | | | | | | | | Al | Si 1.9 E-4 .08 E-4 | P | S | Cl | Ar |
| K | Ca | Sc | Ti 3.89 E-4 6.43 E-4 | V 4.93 E-4 9.22 E-4 | Cr 6.26 E-4 1.33 E-4 | Mn 7.12 E-4 1.69 E-4 | Fe 6.84 E-4 1.81 E-4 | Co 7.54 E-4 2.22 E-4 | Ni 7.28 E-4 2.55 E-4 | Cu 9.17 E-4 4.95 E-4 | Zn | Ga | Ge | As | Se | Br | Kr |
| Rb | Sr | Y | Zr | Nb 6.0 E-4 1.1 E-4 | Mo 7.2 E-4 1.4 E-4 | Tc | Ru | Rh | Pd | Ag | Cd | In | Sn | Sb | Te | I | Xe |
| Cs | Ba | La | Hf 5.2 E-4 1.4 E-4 | Ta 7.0 E-4 1.9 E-4 | W 8.6 E-4 2.3 E-4 | Re 10.5 E-4 2.6 E-4 | Os | Ir | Pt 10.7 E-4 3.1 E-4 | Au | Hg | Tl | Pb | Bi | Po | At | Rn |

B₄C: 2.2 E-4, .07 E-4

FIG. 17 TABLE OF DELTA AND BETA COEFFICIENTS WITH Mg-kα X-RAYS FOR SELECTED ELEMENTS AND COMPOSITIONS

| H | | | | | | | | | | | | | | | | | He |
|---|---|---|---|---|---|---|---|---|---|---|---|---|---|---|---|---|---|
| Li | Be | | | | | | | | | | | B .30 E-3 .12 E-4 | C .37 E-3 .24 E-4 | N | O | F | Ne |
| Na .15 E-3 .07 E-4 | Mg | | | | | | | | | | | Al | Si .3 E-3 .16 E-4 | P | S | Cl | Ar |
| K | Ca | Sc | Ti 5.46 E-4 1.18 E-4 | V 6.89 E-4 1.68 E-4 | Cr 8.67 E-4 2.42 E-4 | Mn 9.79 E-4 3.1 E-4 | Fe 6.89 E-4 1.68 E-4 | Co 10.1 E-4 4.0 E-4 | Ni 10.1 E-4 4.59 E-4 | Cu 9.17 E-4 4.95 E-4 | Zn | Ga | Ge | As | Se | Br | Kr |
| Rb | Sr | Y | Zr | Nb .8 E-3 1.8 E-4 | Mo 1.0 E-3 2.4 E-4 | Tc | Ru | Rh | Pd | Ag | Cd | In | Sn | Sb | Te | I | Xe |
| Cs | Ba | La | Hf 1.2 E-3 4.2 E-4 | Ta 1.6 E-3 5.6 E-4 | W 1.9 E-3 6.8 E-4 | Re 2.2 E-3 7.7 E-4 | Os | Ir | Pt 1.5 E-3 5.2 E-4 | Au | Hg | Tl | Pb | Bi | Po | At | Rn |

B₄C .31 E-3 .14 E-4

TABLE OF DELTA AND BETA COEFFICIENTS WITH N-kα X-RAYS

FIG. 18

FOR SELECTED ELEMENTS AND COMPOUNDS $B_4C$: 3.12 E-3 / 1.09 E-3

| H | | | | | | | | | | | | | | | | | He |
|---|---|---|---|---|---|---|---|---|---|---|---|---|---|---|---|---|---|
| Li | Be | | | | | | | | | | | B 3.09 E-3 .93 E-3 | C 3.24 E-3 1.69 E-3 | N | O | F | Ne |
| Na | Mg 2.16 E-3 .48 | | | | | | | | | | | Al | Si 2.97 E-3 .98 | P | S | Cl | Ar |
| K | Ca | Sc | Ti 2.08 E-3 4.98 E-3 | V 3.41 E-3 .75 E-3 | Cr 5.17 E-3 1.03 E-3 | Mn 6.12 E-3 1.30 E-3 | Fe 6.13 E-3 1.43 E-3 | Co 7.14 E-3 1.81 E-3 | Ni 7.68 E-3 2.10 E-3 | Cu 7.36 E-3 2.26 E-3 | Zn | Ga | Ge | As | Se | Br | Kr |
| Rb | Sr | Y | Zr | Nb | Mo 4.75 E-3 5.21 E-3 | Tc | Ru | Rh | Pd | Ag | Cd | In | Sn | Sb | Te | I | Xe |
| Cs | Ba | La | Hf 5.45 E-3 4.28 E-3 | Ta 6.69 E-3 5.64 E-3 | W 7.58 E-3 6.77 E-3 | Re 8.80 E-3 7.51 E-3 | Os | Ir | Pt 7.12 E-3 8.24 E-3 | Au | Hg | Tl | Pb | Bi | Po | At | Rn |

FIG. 19 — TABLE OF DELTA AND BETA COEFFICIENTS FOR SELECTED ELEMENTS AND COMPOUNDS WITH B-Kα X-RAYS

| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| H | | | | | | | | | | | | | | | | | He |
| Li | Be | | | | | | | | | | | B<br>.05 E-2<br>.04 E-2 | C<br>1.03 E-2<br>.09 E-2 | N | O | F | Ne |
| Na | Mg<br>.87 E-2<br>.56 E-2 | | | | | | | | | | | Al | Si<br>.84 E-2<br>1.06 E-2 | P | S | Cl | Ar |
| K | Ca | Sc | Ti<br>1.27 E-2<br>.37 E-2 | V<br>1.68 E-2<br>.53 E-2 | Cr<br>2.27 E-2<br>.80 E-2 | Mn<br>2.57 E-2<br>.97 E-2 | Fe<br>2.47 E-2<br>1.17 E-2 | Co<br>2.74 E-2<br>1.49 E-2 | Ni<br>2.82 E-2<br>1.72 E-2 | Cu<br>2.64 E-2<br>1.96 E-2 | Zn | Ga | Ge | As | Se | Br | Kr |
| Rb | Sr | Y | Zr | Nb<br>1.42 E-2<br>.33 E-2 | Mo<br>1.70 E-2<br>.31 E-2 | Tc | Ru | Rh | Pd | Ag | Cd | In | Sn | Sb | Te | I | Xe |
| Cs | Ba | La | Hf<br>1.27 E-2<br>1.54 E-2 | Ta<br>1.51 E-2<br>1.87 E-2 | W<br>1.59 E-2<br>2.06 E-2 | Re<br>1.91 E-2<br>2.05 E-2 | Os | Ir | Pt<br>1.57 E-2<br>1.70 E-2 | Au | Hg | Tl | Pb | Bi | Po | At | Rn |

TABLE OF DELTA AND BETA COEFFICIENTS WITH C-kα X-RAYS FOR SELECTED ELEMENTS AND COMPOUNDS

| H | | | | | | | | | | | | | | | | | He |
|---|---|---|---|---|---|---|---|---|---|---|---|---|---|---|---|---|---|
| Li | Be | | | | | | | | | | | B 5.34 E-3 3.11 E-3 | C 1.17 E-3 .22 E-3 | N | O | F | Ne |
| Na | Mg 4.26 E-3 1.49 E-3 | | | | | | | | | | | Al | Si 5.50 E-3 6.00 E-3 | P | S | Cl | Ar |
| K | Ca | Sc | Ti .56 E-2 .17 E-2 | V .76 E-2 .18 E-2 | Cr 1.06 E-2 .27 E-2 | Mn 1.23 E-2 .34 E-2 | Fe 1.21 E-2 .39 E-2 | Co 1.38 E-2 .49 E-2 | Ni 1.46 E-2 .58 E-2 | Cu 1.42 E-2 .59 E-2 | Zn | Ga | Ge | As | Se | Br | Kr |
| Rb | Sr | Y | Zr | Nb 3.82 E-3 5.93 E-3 | Mo 4.33 E-3 6.00 E-3 | Tc | Ru | Rh | Pd | Ag | Cd | In | Sn | Sb | Te | I | Xe |
| Cs | Ba | La | Hf 8.49 E-3 8.45 E-3 | Ta 10.13 E-3 10.92 E-3 | W 11.05 E-3 12.95 E-3 | Re 12.44 E-3 14.06 E-3 | Os | Ir | Pt 9.64 E-3 12.29 E-3 | Au | Hg | Tl | Pb | Bi | Po | At | Rn |

B₄C: 4.51 E-3, 2.5 E-3

X-RAY DISPERSIVE AND REFLECTIVE STRUCTURES

This is a continuation-in-part of co-pending application Ser. No. 501,659, filed on June 6, 1983, now abandoned.

BACKGROUND OF THE INVENTION

This invention relates to improved X-ray dispersive and reflective structures and methods of synthesizing the structures. These synthetic structures are free from the constraints of crystalline symmetries and from the restrictive prior art vapor deposition techniques and materials. The improved dispersive and reflective X-ray structures provide controlled reflectivity and can have improved reflectivity in first and higher orders; or for a particular application an increased first order reflectivity and substantially no intensity from higher order reflections. The improved structures have a substantially constant integral reflection coefficient over a wavelength range of interest, including substantially no fluorescence in the wavelength range. The invention has a wide range of applications for substantially all fields requiring the dispersion and reflection of X-rays, particularly with wavelengths from 9.75 to 120 Å, such as crystal analyzers for spectrographic analysis, crystal monochrometers, X-ray laser cavity mirrors, X-ray telescopes and certain X-ray photo lithographic equipment.

Commercial X-ray dispersive structures are formed from crystalline structures such as LiF, metal acid phthalaters (map), pyrolytic graphite and Langmuir-Blodgett (LB) films. These materials have very restrictive lattice spacing constraints. In addition, the LB and map devices have severe environmental limitations and must be operated near room temperature in a dry enviroment. LB devices are not appropriate for very high vacuum applications since under certain conditions they can evolve contaminants. They are also inappropriate for high incident beam energy applications since they can decompose. They have poor mechanical integrity, such as scratch resistance, mechanical breaking strength and resistance to abrasion. Further, all of the prior structures have lower reflectivities than desired.

Numerous attempts to construct both natural and new crystalline analogue materials have been made with the aim of extending the X-ray properties heretofore limited by the availability of natural crystalline materials. One such attempt is compositional modulation by molecular beam epitaxy (MBE) deposition on single crystal substrates. For example, in Dingle et al., U.S. Pat. No. 4,261,771, the fabrication of monolayer semiconductors by one MBE technique is described. These modulated prior art structures are typically called "superlattices." Superlattices are developed on the concept of layers of materials forming homo or hetero epitaxially grown planes or films layers resulting in a one-dimensional periodic potential. Typically, the largest period in these superlattices is on the order of a few hundred Angstroms; however, monatomic layered structures have also been constructed.

The superlattices can be characterized by the format of a number of layer pairs formed by a layer of A (such as GaAs) followed by a layer of B (such as AlAs), etc.; formed on a single crystal synthetic material with good crystalline quality and long range order. The thickness of each layer pair (A and B) is defined as "d" spacing. These structures are not appropriate for most reflective or dispersive structures due to the small electron density contrast between the layers. These structures being essentially single crystals with extra super lattice periodicities also suffer from restrictive d spacing, associated with the constraint that the entire structure be a single crystal.

In addition to the MBE type of superlattices construction techniques, other researchers have developed layered synthetic microstructures (lsm) utilizing other forms of vapor deposition, including diode and magnetron sputtering, reactive gas injection and standard multisource evaporation. The layer dimensions are controlled by shutters or moving the substrates relative to the material sources or with combinations of shutters and relative motion. In the case of multisource evaporation, the required thickness control is achieved by monitoring the X-ray reflectivity of the film in situ as the deposition is being made. The materials reported have been formed from crystalline layers, noncrystalline layers and mixtures thereof; however, generally the efforts so far reported are directed at the synthesis of superlattice-type structures by precisely reproducing the deposition conditions on a periodic reoccurring basis. Some of the structures have graded d spacing through the structure.

These materials can be thought of as synthetic crystals or crystal analogues in which it is defined as crucial that the long range periodicity or repetition of a particular combination of layers be maintained. These structures are both structurally and chemically homogeneous in the x-y plane, and are periodic in the third (z) direction. These construction approaches particularly sputtering, can utilize a greater variety of materials than evaporation. The d spacing in a structure can be graded throughout the structure to provide some reflectivity for a range of X-ray wavelengths, but they do not achieve optimum control of higher order reflections and the deposition precision is not as good as desired. This results in interfaces and layer thicknesses which are not as precise as desired for certain applications. While smoothing of the underlying substrate or layers has been reported as multiple layers are deposited, the minimum smoothness reported has been about 1.4 to 1.8 Å. Also, the minimum reported d spacing for any significant reflectivity has been above 15 Å. One desired goal in producing high efficiency X-ray reflectors is to produce a maximum contrast in electron density across the most precisely defined interface which produces the greatest number of orders of reflection. Further, the smoothness of the layer surfaces must be as precise as possible to minimize scattering caused by the surface variations.

Prior attempts at utilizing these structures for X-ray applications relied on the use of carbide low density layers between high electron density metal layers for making high reflectivity structures for the soft X-ray region. Other elements that have been suggested for the low electron density layers and in some cases utilized are boron and beryllium. Although these elements do provide high electron density contrast, they suffer from a very great disadvantage, that is they all have absorption edges in the soft X-ray range in which these structures are to be employed. This means that these structures have highly nonconstant reflectivity and resolution across the wavelength range of interest. In addition to the variability of the reflecting properties, these elements also have large fluorescences in the wavelength range of interest which degrade the signal to noise ratio especially when wavelengths near the fluorescence wavelengths are utilized.

SUMMARY OF THE INVENTION

The disadvantages of the prior art are overcome by improved X-ray dispersive and reflective structures and materials. The structures exhibit reflection coefficients in the soft X-ray range (9.75 Å to 120 Å) which are at least one third of the theoretical integral reflection coefficient for layered structures over the range. The structures exhibit high interfacial chemical stability at the interfaces between individual layers of the structure. This is accomplished by selecting the members of the layer pair having a low enough electronegativity difference, atomic radius difference, and bond length difference to avoid degradation of the optical properties through, e.g., interfacial chemical reaction, interfacial chemical diffusion, or a combination thereof. The structures are formed of materials which have small difference in electronegativity, atomic radius and bond length to optimize the ability to control interfacial characteristics.

The structures can be formed to exhibit ultrasmooth layer interfaces having a root mean square roughness less than 1.4 Å and can have d spacings of less than 15 Å. The materials have reflectivity and resolution better than or equal to those of the prior art, but by the appropriate materials choice and construction they also have no fluorescence and no absorption edges to degrade the performance of the reflectors and/or dispersive elements in the X-ray range of interest.

The structures can be thermally activated to increase first order reflectivity, during or post deposition, and to change or control the reflectivity. The structures also can be annealed at high temperature to provide further control of the reflectivity of all orders of reflection.

The X-ray dispersive structures also can have a controllable essentially continuously varying index of refraction. The continuously varied refractive index structures can be formed by an improved ion beam deposition technique, which can also be utilized to form the layered synthetic microstructures of the prior art in a more precise manner. The ion beam system is utilized to deposit amorphous materials to precisely control the electron density as a predetermined function throughout the structure.

The X-ray dispersive and reflective structures can be formed from magnetic materials and can be formed onto substantially cylindrical substrates. The ion beam technique can include a two ion beam system and one beam can be a reactive ion beam utilizing reactive gases.

BRIEF DESCRIPTION OF THE DRAWINGS

FIG. 12 is a Periodic Chart showing the electronegativities of the metals and Berylium, Boron, Carbon, Silicon, and Germanium from Pauling *The Nature of the Chemical Bond,* (1960), Table 3-8.

FIG. 13 is a Periodic Chart showing the Atomic Radii, in Angstroms, of the metals, and Berylium, Boron, Carbon, Silicon, and Germanium, from *Table of the Periodic Properties of the Elements,* Sargent-Welch Scientific Company, Skokie, IL., Catalog No. S-18806.

FIG. 14 is a Periodic Chart showing the Bond Lengths, in Angstroms, of the metals and Berylium, Boron, Carbon, Silicon, and Germanium, from Chemical Publishing Company, *Handbook of Chemistry and Physics* (1974), Page F-201 et seq.

FIG. 15 is an abbreviated Periodic Chart showing the Delta and Beta Coefficients with Cu-K-alpha X-rays for selected elements and compositions.

FIG. 16 is an abbreviated Periodic Chart showing the Delta and Beta Coefficients with Al-K-alpha X-rays for selected elements and compositions.

FIG. 17 is an abbreviated Periodic Chart showing the Delta and Beta Coefficients with Mg-K-alpha X-rays for selected elements and compositions.

FIG. 18 is an abbreviated Periodic Chart showing the Delta and Beta Coefficients with N-K-alpha X-rays for selected elements and compositions.

FIG. 19 is an abbreviated Periodic Chart showing the Delta and Beta Coefficients with C-K-alpha X-rays for selected elements and compositions.

FIG. 20 is an abbreviated Periodic Chart showing the Delta and Beta Coefficients with C-K-alpha X-rays for selected elements and compositions.

DESCRIPTION OF THE PREFERRED EMBODIMENT

Figure 1:
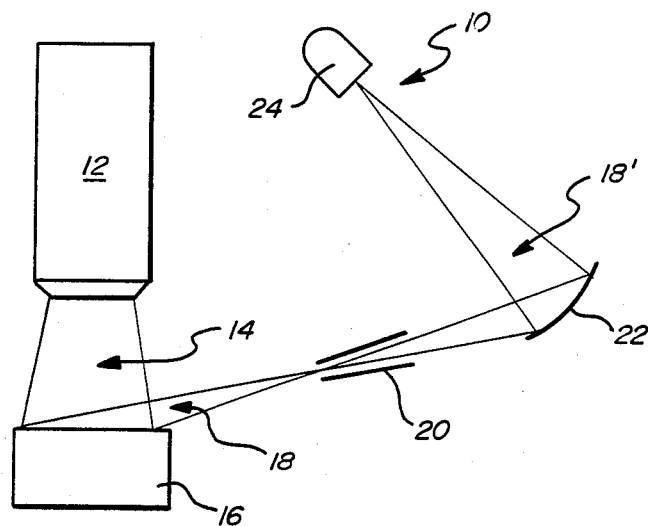
FIG. 1 is a partial diagrammatic representation of one embodiment of X-ray analysis system which can utilize the X-ray dispersive structures of the invention.

Referring to FIG. 1, there is shown a diagrammatical representation of a conventional X-ray analysis system 10. The system 10 includes an X-ray source 12 which directs a beam of X-rays 14 at a sample 16. A beam 18 of fluorescent radiation is emitted by the sample 16 which is aligned to pass through an aperture 20 onto an X-ray dispersive structure 22 which reflects a beam 18' to a detector 24. The curvature of the structure 22 is exaggerated, but it is slightly curved to focus the desired wavelengths of the reflected beam 18' onto the detector 24.

Figure 2:
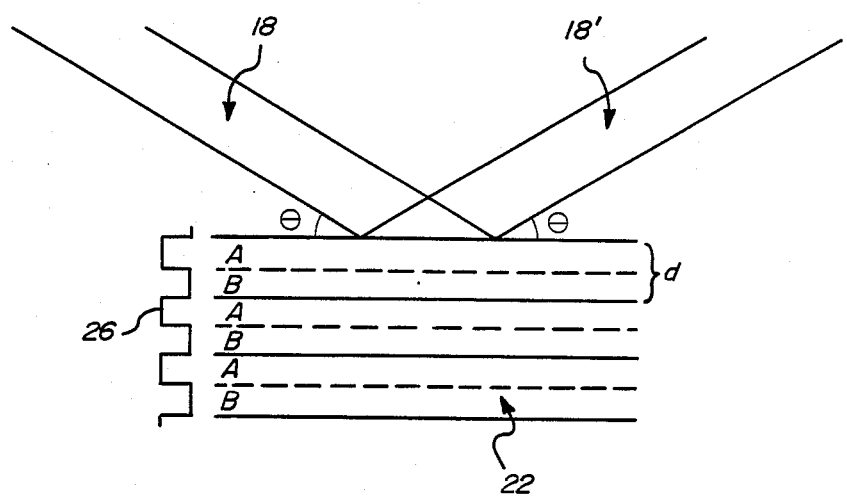
FIG. 2 is an exploded partial sectional view of a prior art X-ray dispersive structure illustrating the X-ray dispersive pattern.

FIG. 2 shows the dispersion pattern of a typical prior art layered structure 22. While only three layer pairs have been shown, having a layer spacing d, typically many layer pairs are utilized for example on the order of 100-2000. The incident beam 18 is made up of a band of wavelengths, $\lambda$ being an example of one wavelength. The reflected beam 18' is made up of a substantially single wavelength $\lambda$ reflected at angle $\theta$, approximately according to Bragg's law $n\lambda' = 2d \sin \theta$. This condition is also satisfied for all subharmonics of $\lambda'$, i.e. $\lambda'/2$, $\lambda'/3$ ... $\lambda'/n$. Therefore, the reflected beam 18' contains all of these wavelengths in proportion to both their intensity in the incident beam and the magnitude of the higher orders of reflection which result from the rectangular electron density distribution, as illustrated in FIG. 2. $I_i(\lambda)$ is the incident intensity distribution of $\lambda$ and $I_r(\lambda')$ is the reflected intensity distribution of $\lambda'$. (A full theoretical treatment results in a modification of Bragg's law resulting from refraction of the X-ray beam.)

Each layer pair contributes to the reflected beam intensity at a like angle. The reflection from only one layer pair is illustrated. The structure 22 generally is curved to focus the reflected wavelength of interest from each layer pair onto the detector 24. The structure 22 is formed from a plurality of layers, each layer of which includes a pair of different material layers A and B which is intended to have an abrupt junction between each layer. Functionally, this means there essentially is a square wave density or reflection index 26 which intercepts the beam 18.

Figure 3:
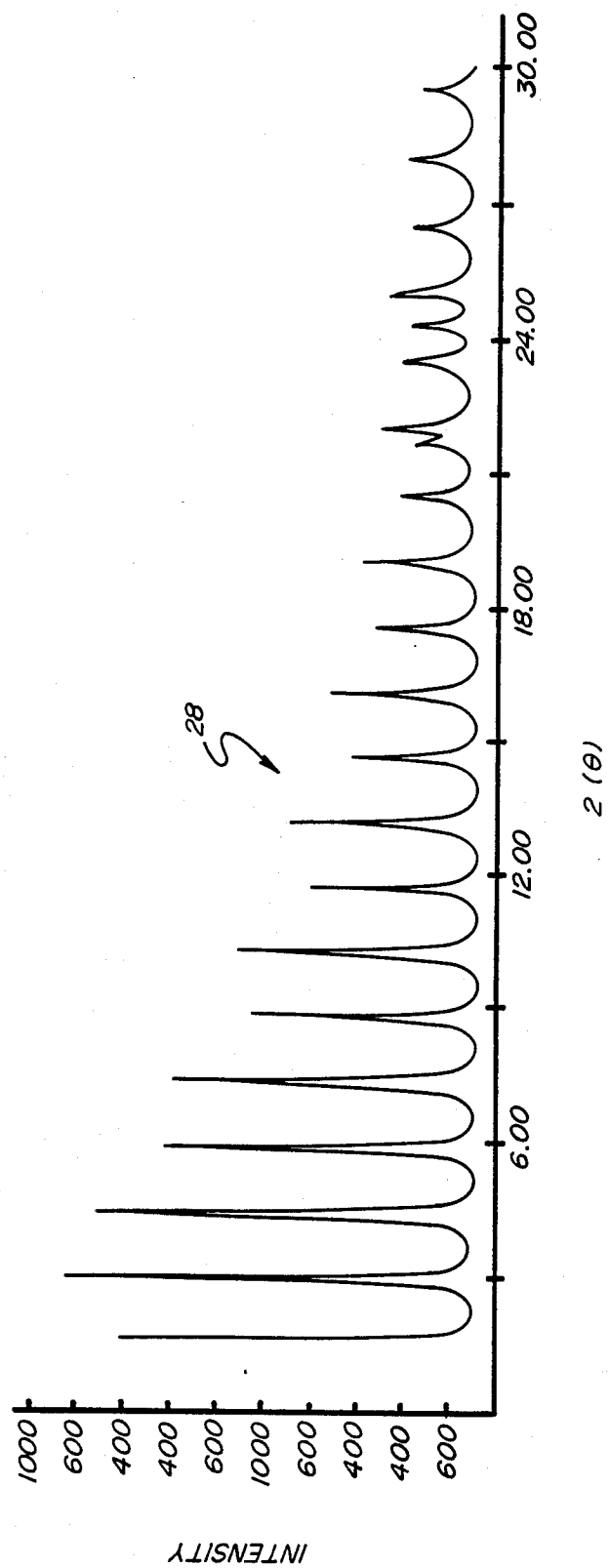
FIG. 3 is a diffraction pattern generated by the prior art structure of FIG. 2.

FIG. 3 illustrates a diffraction pattern 28 caused by the incident beam 18 impinging on a prior art LB X-ray dispersive structure. Each of the peaks is an order of reflection, n, for the wavelength $\lambda'$ (the wavelength of interest) as derived according to the approximate relationship $n\lambda' = 2d \sin \theta_n$. The prior art lsm devices exhibit similar diffraction patterns, which essentially are controlled by the materials deposited and the d spacings utilized. It would be desirable to control the diffraction pattern, by more precise control of the layered structures and to eliminate any fluorescence and absorption edges in the X-ray range of interest as described later.

Also, it can be desirable to reflect all the incoming beam energy at wavelength $\lambda$ at a single angle. This would substantially increase the intensity of the reflected wavelengths at each corresponding angle and simplify the analysis of the diffracted beam and hence the chemical composition of the sample. Another application is for monochromators.

Figure 4:
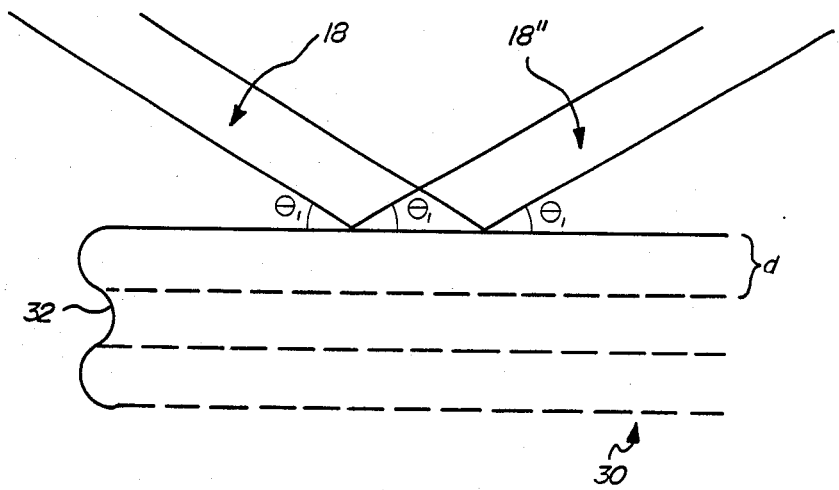
FIG. 4 is an exploded partial sectional view of one embodiment of the X-ray dispersive structure of the invention illustrating the X-ray diffraction pattern.

FIG. 4 illustrates one desired diffracted beam pattern 18" from a dispersive structure 30 of the invention which reflects all the incident beam energy of a particular wavelength at separate angles, for example $\lambda$, at $\theta_1$. All different wavelengths including subharmonics of the wavelength of interest would be reflected at different angles. The structure 30 is formed by the techniques described below, to result in a substantially continuously varying electron density or refractive index 32. A sinusoidal refractive index is necessary to produce a single diffraction angle for each incident wavelength. Although a d spacing is also shown here, the materials such as C and D are materials whose compositions vary essentially sinusoidally in composition throughout the structure, such as amorphous alloys. This sinusoidal variation of the maximum electron density contrast through the structure 30 produces a structure with the greatest percentage of radiation in the first order reflection.

Figure 5:
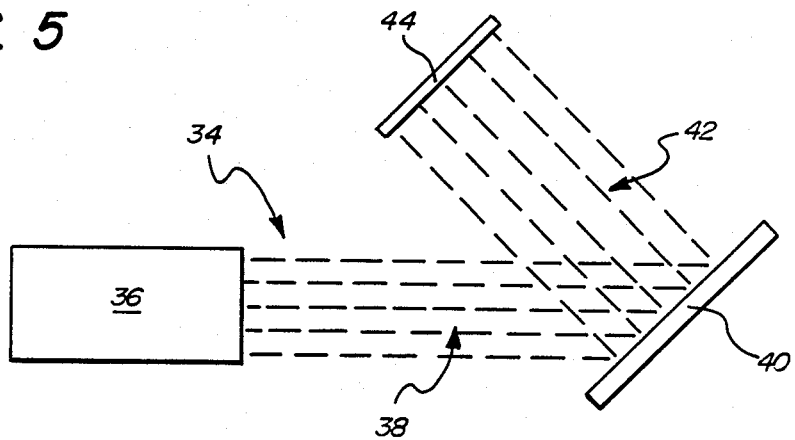
FIG. 5 is a partial side view diagrammatical representation of one embodiment of ion beam deposition technique of the invention.
Figure 6:
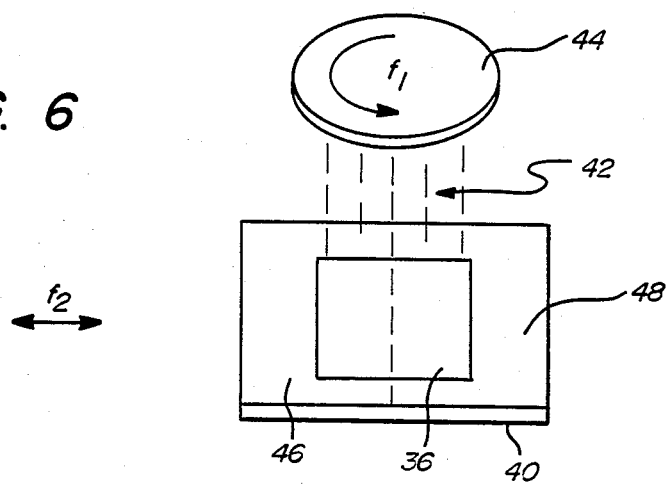
FIG. 6 is a partial end view diagrammatical representation of the technique of FIG. 5.

In order to control the exact composition and microstructure as a function of thickness through the dispersive structures 30, it is necessary to control the magnitude of the kinetic energy of the deposited atoms and their incident momenta. These deposition parameters are best controlled by depositing the materials in an ion beam system to accurately control the average electron density as a function of position throughout the structure. One embodiment of a suitable ion beam system 34 is illustrated in FIGS. 5 and 6.

Ion beam techniques have not been utilized to deposit prior X-ray dispersive and reflective structures, but the techniques as adapted by the invention are desirable due to their precision and control of the deposition parameters as well as the decoupling of the ion plasma from the substrate and minimization of undesirable components in depositing the desired structure. An ion source 36 generates a beam of ions 38 which are neutralized and directed at a suitable target 40. The beam 38 sputters material from the target 40 into a substantially collimated and uniform stream 42 which is deposited on a suitable substrate 44. The substrate 44 can be mounted on a holder (not shown) and the system 34 is under vacuum which can be substantially lower than that utilized in magnetron or diode sputtering. The substrate 44 also can be heated or cooled as desired to affect the structure of the material deposited as described hereinafter.

Because of the precision of the ion beam system 34, the layers can be produced with a smoothness below 1.4 Å. One structure was formed of 30 layer pairs of W and C with a d spacing of 33.5 Å and a nominal composition of $W_{50}C_{50}$. The rms roughness $\Delta d$ (or smoothness) was 0.93 Å as defined by:

$$\frac{I_r}{I_i} = \left(\frac{I_r}{I_i}\right)_{ideal} e^{-(4\pi n \Delta d/d)^2}$$

The precision and smoothness of the layer interfaces directly affects the reflection pattern. The structure was deposited at room temperature, at a pressure of $1 \times 10^{-4}$ torr, with argon flowing into the gun 36 at 2.8 sccm and the density of the beam 38 at 10 ma/cm². The best reported rms roughness for a prior art lsm structure is for W:C and is about 1.4 Å.

As best illustrated in FIG. 6, the ion source 36 preferably is a square cross section source which generates a substantially square section beam 38. The substrate 44 preferably is rotated at a frequency $f_1$, to ensure an even deposition across the substrate 44, preferably in the range of 10-20 rpm. The target 40 is divided into two sections 46 and 48, each formed from a different material, C and D as described above. To form the rectangular electron density structures, the source can be turned off while the target is translated or it can be shuttered to effect the complete separation of the material layers. While, the source 36 and substrate 44 could be oscillated back and forth in a controlled manner to generate the continuously varying index of refraction 32, preferably the target is oscillated in front of the beam 38 at a frequency $f_2$. As utilized herein, frequency is defined as a prescribed rate of repetitions of relative orientations and is not limited to sinusoidal repetitions.

The frequency $f_1$ preferably is much greater than the frequency $f_2$, for example on the order of 100 times $f_1$. For different materials and structures $f_1$ and $f_2$ will be different and section 46 might be passed in front of the beam 38 at a different rate or with a different beam power than section 48. Further, the sections 46 and 48 can be separate targets and there can be more than two sections, which also can be controlled by shutters (not shown) if desired.

The materials on the target 48 can be in more than two sections and, for example, can be four sections which can be deposited in two sets of layer pairs, A and B and C and D. The two sets can be selected such that two different wavelengths of interest, $\lambda_1$ and $\lambda_2$, are both reflected at the same angle to the detector 24 or to different detectors. Single element materials, compounds, alloys or combinations thereof can be utilized.

Figure 7:
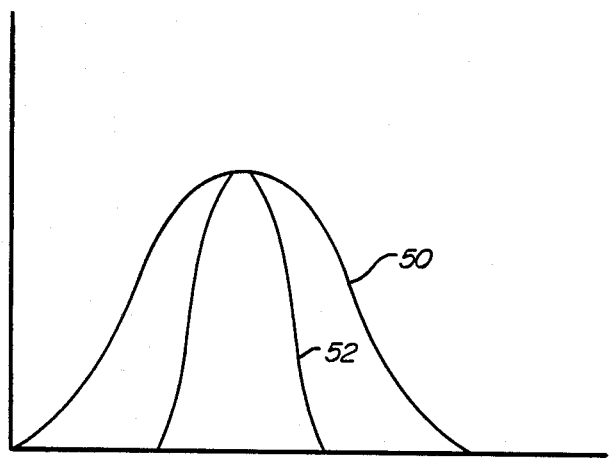
FIG. 7 is a diagram of reflected wavelength resolution.

FIG. 7 is a diagram illustrating the reflected wavelength resolution. The more narrow the bandwidth, the more resolution is obtained from the reflected signal, hence a reflected bandwidth 50 has much less resolution than the same reflected signal with a bandwidth 52. The precision of the system 34 can result in a much more narrow reflected bandwidth than the prior lsm type of X-ray structures 22.

Figure 8:
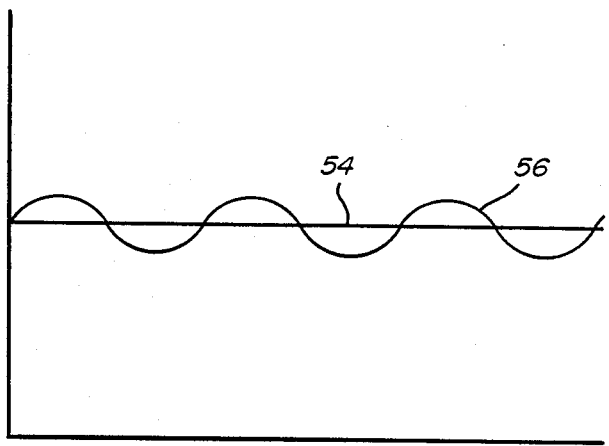
FIG. 8 is a diagram of controlled bandwidth of the reflected signal.

FIG. 8 illustrates another advantage of the deposition techniques of the present invention. Since amorphous materials are not limited to any one structure, utilizing the deposition techniques of the invention the maximum and minimum electron density contrast for each layer can be varied as desired. In the prior lsm structures 22, material A is alternated with material B, and hence the electron density is limited to a pseudorectangular distribution. Further, a maximum reflectivity 54 can be chosen with a minimum deviation 56 of reflected bandwidths around the maximum 54.

Figure 9:
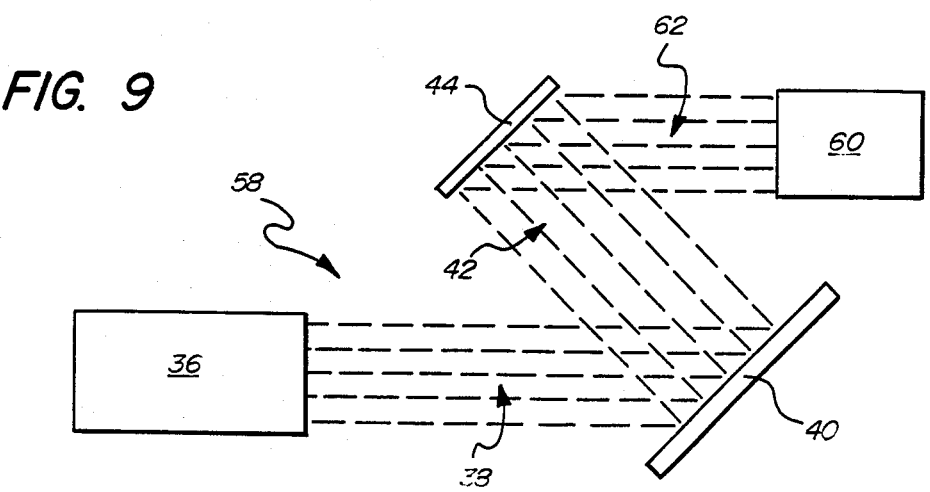
FIG. 9 is a partial diagrammatical representation of a second embodiment of the ion beam deposition technique of the invention.

FIG. 9 illustrates a second ion beam system 58, which can be identical to the system 34 with the addition of a second ion beam source 60. The ion beam source 60 generates an ion beam 62 which can be a reactive ion beam formed from argon and/or nitrogen or other suitable materials and combinations thereof. A reactive ion beam can be utilized to control the density of the materials in a selected layer or layers or in all layers. The substrate 44 is again rotated at a speed $f_1$ and the target 40 is oscillated in front of the beam 38 at a frequency $f_2$. The current of the reactive beam 62 can be controlled at a third frequency $f_3$ to modulate and assist in the deposition of the material onto the substrate 44. The ion current of the ion source 36 also can be varied at a fourth freqency $f_4$, to provide a further control of the deposition process.

Figure 10:
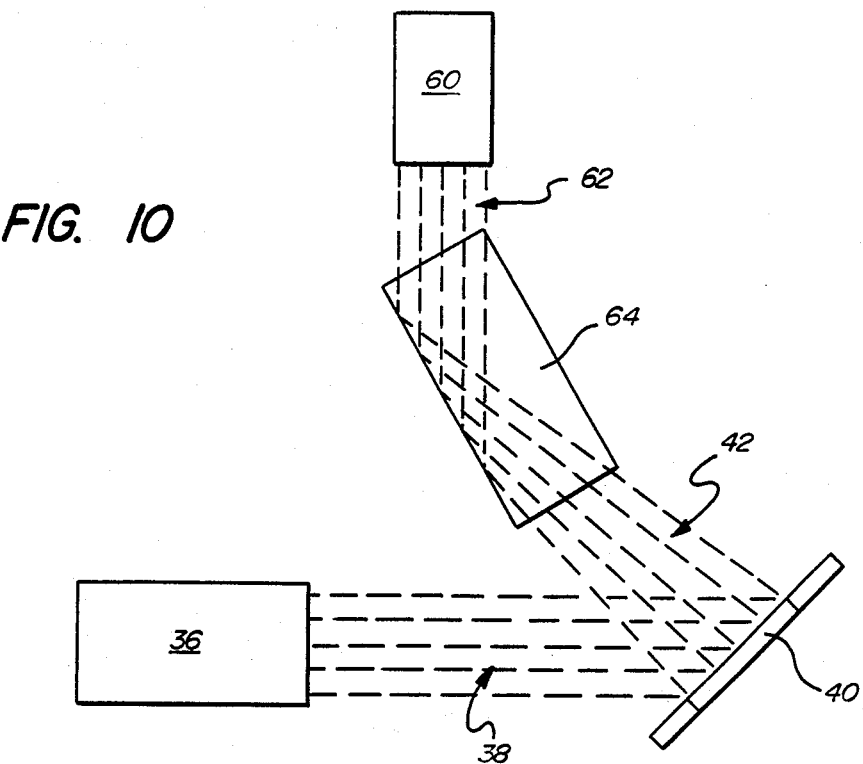
FIG. 10 is a partial diagrammatical representation of the techniques of FIGS. 5 and 9 utilized to deposit on a cylindrical surface.

The deposition systems of the invention can also be utilized to deposit the dispersive or reflective structures onto the inside of a substantially curved or cylindrical substrate 64, as illustrated in FIG. 10. The substrate 64 can be coated by the stream 42 or by both the beam 62 and stream 42. The reactive source alignment is not crucial and the source 60 can also be aligned to enter the cylinder from the same direction as the stream 42. The substrate 64 would again be rotated at a frequency $f_1$ to provide a uniform deposition and the frequency of the target 40 is selected as previously described.

Figure 11:
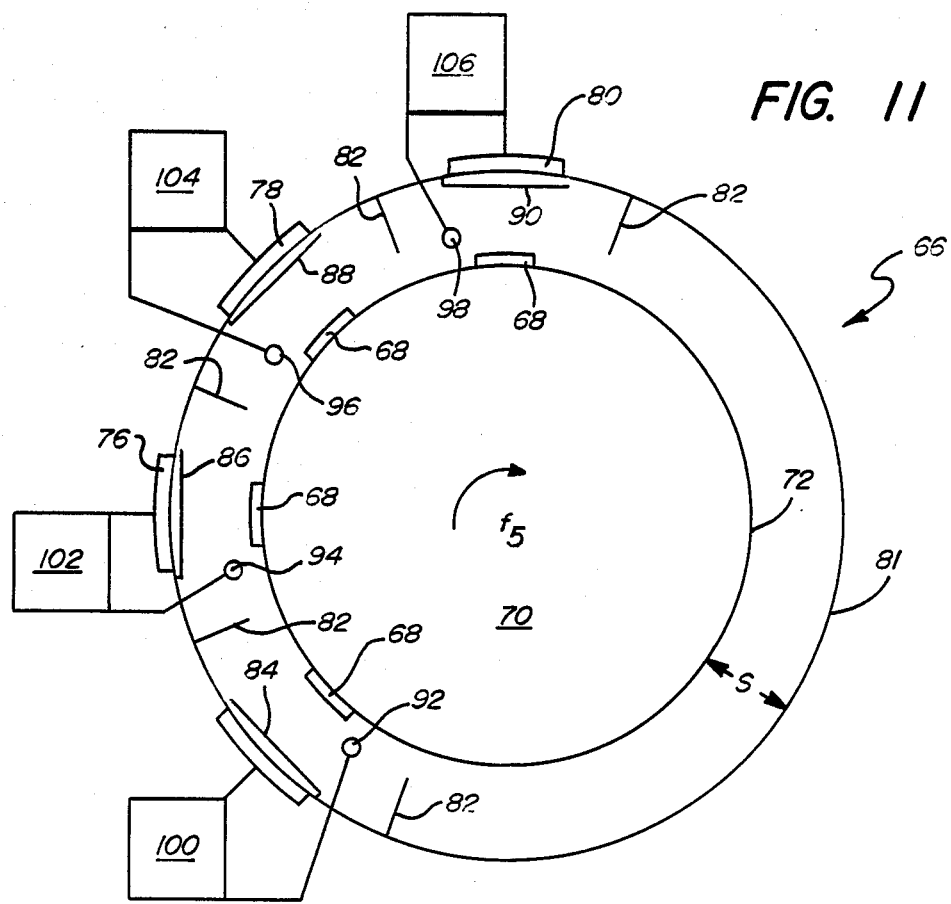
FIG. 11 is a partial diagrammatical representation of a third deposition technique embodiment of the invention.

A third type of deposition system 66 is illustrated in FIG. 11. The system 66 is a magnetron sputtering deposition system which confines the plasma to the vicinity of a plurality of target 74, 76, 78 and 80 separated from a plurality of substrates 68 fixed to a rotating drum 70. The outer surface of the drum 70 also could be utilized as a substrate 72 if desired. The drum 70 can be heated or cooled as desired and is rotated at a frequency $f_5$ to pass the substrate 68 past a plurality of targets 74, 76, 78 and 80 mounted on a shell 81 of the system.

Each target 74, 76, 78 and 80 is isolated by a variable height isolation shield 82. Each target 74, 76, 78 and 80 has associated therewith a shutter 84, 86, 88 and 90, a deposition rate monitor 92, 94, 96 and 98 which is coupled to a respective power supply 100, 102, 104 and 106. Each target thus has its own power supply, shutter and deposition monitor to provide a control loop at each deposition station. Although four stations have been illustrated, more or less can also be provided.

The space "S" between the drum surface 72 and shell 80 is varied to cotrol the impact of the secondary electrons on the substrate to maximize the decoupling of the magnetron confined plasma from the substrates to provide a more uniform and controlled deposition. The system 66 is operated under vacuum with a sputtering gas such as argon. In addition, a reactive gas, such as hydrogen or a compound containing hydrogen, can be injected into the plasma adjacent the target for the effects described above. The system can make many substantially identical modulated structures on the plurality of substrates 68 or can make a single structure on the cylinder 72.

The present invention also includes the choice of the most appropriate materials which can take full advantage of the improved synthesis techniques above described. It has been previously known that the reflectivity properties of lsm devices can be controlled by controlling the electron density as a function of depth in the lsm device. For example, to obtain the maximum reflectivity it is known that the constituents should be chosen with the maximum electron density differences between the layers. Hence the dominant choice in the prior art lsm devices has been W:C or W-Re:C layers.

However an absolute maximum in electron density differences could result in a synthetic layered material having poor interfacial stability with respect to time, temperature, or service use. Additional factors are important and must be considered in the choice of layer pair materials.

Additional factors which are important in achieving the maximum control over the composition gradients in the structures of the present invention are relative electronegativities, atomic diameters and bond lengths. The smaller difference in electronegativities means that there is less of a tendency for these materials to react when they are placed by deposition processes into adjacent layers. It is for these reasons that the materials that have the smallest electronegativity difference and the greatest electron density difference should be utilized to synthesize structures with the highest peak reflectivity. From a geometric point of view, the greater the similarity between atomic sizes and bond lengths the more effectively these materials can be mixed and layered in a prescribed fashion.

We observe that in the prior art lsm structures constructed from tungsten and carbon, the Pauling electronegativities are 1.7 and 2.5, respectively. Additionally, the covalent radii are 1.3 and 0.77 Å and the bond lengths are 2.74 and 1.54 Å, respectively. It has been published that the tungsten carbon prior structures when deposited by sputtering do not layer as tungsten and carbon, but rather as tungsten carbide and carbon.

The chemical reactions which occur at the interfaces between the W and C constituents are partially controlled by these chemical and physical mismatches and thereby make difficult the construction of perfectly controlled interfaces.

To synthesize structures with the maximum precision the materials of the invention have been chosen so that there is a minimum electronegativity difference between the species involved and the closest similarity in covalent radii and the minimum distance in bond length (including M–M bond lengths, non-M and non-M bond lengths and non-M and M bond lengths). The Pauling electronegativities for Hf and Si materials are 1.3 and 1.8, respectively for the metal and the nonmetal. In addition to being concerned about how well the layering and maximizing the electron density contrast can be controlled, it is also necessary that the materials that are used not have spurious fluorescences which would reduce the signal to noise ratios in spectroscopic applications. When this fact is also included in the requirements for a material to be a reflecting/dispersive element, the most correct pairs of materials are hafnium:silicon, rhenium:silicon or Hf-Re:Si for the wavelength range of 9.75 Å to 120 Å. Utilizing the concepts of the invention in the magnetron sputtering system, a structure formed from layers of Hf and Si was deposited which had a d spacing of 7.85 Å. The layers were deposited at room temperature with 2 microns background pressure in argon.

As stated above, the other feartures which are important in controlling the quality of the layered structures include the atomic diameters of the materials and the bond lengths of the separate elements between themselves. Using the criterion that the atomic size and the bond lengths of the high and low electron density materials be as similar as possible results in the choice of silicon as the nonmetal and Hf, Re or Hf-Re alloys as the higher electron density materials in the layered structures for use in the soft X-ray range. The bond lengths of Hf and Si are 3.13 and 2.35 Å, respectively. The covalent radii of hafnium, rhenium and silicon are 1.44 Å, 1.28 Å and 1.11 Å, respectively.

The other nonmetals which might be considered are carbon, boron, and beryllium. All of these elements have bond lengths of about 1.5 Å. Thus these alternative light elements would cause a very large mismatch in atomic sizes and bond lengths at the interfaces making optimum control of the structure more difficult. As stated before the electronegativities of boron and carbon are greater than those of the optimum metals, thus destabilizing the structures toward compound formation, and of course all of these light elements will fluoresce when used as soft X-ray spectrometers and mirrors.

Using these same principles, a material which would give optimum structures for highest resolution dispersive structures must be compatible from the chemical point of view and in addition have a small electron density contrast, as well as no substantial fluorescence. Aluminum-magnesium:silicon, Al:Si or Mg:Si, structures would be the most appropriate for the use as high resolution soft X-ray devices. The covalent radii for Al and Mg are 1.18 and 1.36 Å, the bond lengths are 2.86 and 3.19 Å and the Pauling electronegativities are 1.5 and 1.2, respectively.

The method of selecting
(A). a high value of the electron density difference (i.e., a high value of the difference between the atomic scattering coefficients, Delta, between the metal and the non-metal of the layer pair);
(B). a low value of the sum of the atomic absorption coefficients (i.e., a low value of the sum of the atomic absorption coefficients, Beta, of the metal and non-metal of the layer pair), the absence of intense absorption edges or fluoresences within the wavelength range of interest; and
(C). low values of:
(1). the Pauling electronegativity difference of the metal and non-metal of the layer pair;
(2). the bond length difference between the metal and non-metal of the layer pair; and
(3). the atomic radius difference of the metal and non-metal of the layer pair.
is shown in Tables 5 through 9, below.

Tables 5a, 5B, and 5C show the normalized values of the difference of the atomic scattering coefficients, Delta, divided by the sum of the atomic absorption coefficients, Beta, at ten wavelengths. Column 1 lists the layer pairs. Columns 2 through 11 display the normalized value of the difference in Deltas divided by the sum of the Betas for X-rays emitted from silicon (Col. 2), aluminum (Col. 3), magnesium (Col. 4), sodium (Col. 5), fluorine (Col. 6), oxygen (Col. 7), nitrogen (Col. 8), carbon (Col. 9), boron (Col. 10), and berylium (Col. 11) targets.

Tables 6A, 6B, and 6C show the presence, indicated by 0, or the absence, indicated by 1, of fluorescences in the follwing six wavelength ranges of interest:
(1). the range from 8.34 Angstroms (aluminum-K-alpha) to 18.3 Angstroms (fluorine-K-alpha) (Col. 12);
(2). the range from 11.91 Angstroms (sodium-K-alpha) to 31.6 Angstroms (nitrogen-K-alpha (Col. 13);
(3). the range from 18.3 Angstroms (fluorine-K-alpha) to 44.7 Angstroms (carbon-K-alpha) (Col. 14);
(4). the range from 23.6 Angstroms (oxygen-K-alpha) to 67.6 Angstroms (boron-K-alpha) (Col. 15); and
(5). the range from 44.7 Angstroms (carbon-K-alpha) to 118 Angstroms (berylium-K-alpha) (Col. 16).
(6). the range from 67.6 (boron-K-alpha) to 118 Angstroms (berylium-K-alpha) (Col. 17)

Tables 7A, 7B, and 7C show the normalized chemical stability parameters for each of the layer pairs. These are the normalized covalent radius (Col. 18), the normalized bond length (Col. 19), and the normalized electronegativity difference (Col. 20). These normalized parameters are then summed, the sum is divided by 3, and the resulting number subtracted from 1. This defines a normalized chemical stability parameter with a 0 value for low stability, and a maximum value of 1 for high stability (Col. 21).

Tables 8A, 8B, and 8C show the normalized X-ray optical parameters for each of the layer pairs in each of the six wavelength ranges of interest, i.e., 8.34 Angstroms to 18.3 Angstroms in Column 22, 11.91 Angstroms to 31.6 Angstroms in Column 23, 18.3 Angstroms to 44.7 Angstroms in Column 24, 23.6 Angstroms to 67.6 Angstroms in Column 25, and 44.7 to 118 Angstroms in Column 26, 67.6 to 118 Angstroms (Col. 27). This is the sum of the normalized X-ray optical parameters (Columns 2 through 11, as appropriate) divided by the number of target elements in the range.

Tables 9A, 9B, and 9C show an overall rating or ranking for each layer pair. This is the product of:
(1). the presence (0) or absence (1) of fluorescences in the wavelength range of interest (one of columns 12 through 17);

(2). the sum of the normalized X-ray optical parameters (Columns 22 through 27) and the normalized chemical stability parameter (Column 21);

Column 28 is calculated using values of fluorescence from column 12 and X-ray parameters from column 22 for the wavelength range 8.34 Angstroms to 18.3 Angstroms; column 29 uses values of fluorescence from column 13 and X-ray parameters from column 23 for the wavelength range 11.91 Angstroms to 31.6 Angstroms; column 30 uses values of fluorescence from column 14 and values of X-ray parameters from column 24 for the wavelength range 18.3 Angstroms to 44.7 Angstroms. Column 31 is calculated using values of fluorescence from column 15 and values of X-ray parameters from column 25, for the wavelength range 23.6 Angstroms to 67.6 Angstroms. Column 32 is calculated using values of fluorescence from column 16 and values of X-ray parameters from column 26 for the wavelength range 44.7 Angstroms to 1.18 Angstroms.

Candidate layer pairs are those having a non-zero value for the "Overall Score In The Wavelength Range" as tabulated in the appropriate column of Table 10A, 10B, or 10C. That is, the layer pair does not exhibit fluorescences in the wavelength range of interest.

Candidate layers are then ordered from the largest value of the entries in one of columns 28 through 33 to the smallest value of the entries in the same column. Column 33 is calculated using values of fluorescence from column 17 and values of X-ray parameters from column 27 for the wavelength range of 67.6 Angstroms to 118 Angstroms. Columns 28 through 33 use the value of the chemical stability parameter in Column 21. A large value indicates a relatively large difference in the Deltas, a relatively small difference in the Betas, and high chemical stability, i.e., relatively small differences in electronegativity, covalent radius, and bond length.

Using the results in Table 10, the following layer pairs could be used in the wavelength range of 8.3 Angstroms (aluminum) to 18.3 Angstroms (fluorine):

(a) Mo:Si, Mo:Mg, Mo:C, Mo:B, Mo:B$_4$C, Mo:Ti, and Mo:V;
(b) Ti:Si; Ti-Mg, Ti:C, Ti:B, Ti:B$_4$C; and Ti:V;
(c) V:Mg, V-C, V-B, V-B$_4$C, and V-Ti;
(d) Hf with one of Si, Mg, C, B, B$_4$C, Ti, and V;
(e) Ta with one of Si, Mg, C, B, B$_4$C, Ti, and V;
(f) W with one of Si, Mg, C, B, B$_4$C, Ti, and V;
(g) Re with one of Si, Mg, C,, B, B$_4$C, Ti, and V;
(h) Pt with one of Si, Mg, C, B, B$_4$C, Ti, and V; and
(i) Nb with one of Si, Mg, C, B, B$_4$C, Ti, and V.

Especially preferred in the Al to F range are Ta-Mg, Ta-Ti, W-Si, W-Mg, W-Ti, W-V, Re-Si, Re-Mg, Re-Ti, Re-V, Nb-Si, Nb-Mg, Nb-Ti, Mo-Si, Mo-Mg, Mo-Ti, and Mo-Mg.

The following pairs are useful in the 11.91 to 31.6 Angstrom range (Na to N):

Hf, Ta, W, Re, Pt, or Nb with Si, Mg, C, B, or B$_4$C.
Especially preferred are Ta:Mg, and W-Mg.

The following pairs are useful in the 18.3 Angstrom to 44.7 Angstrom (F to C) range:

(a) a metal chosen from the group consisting of Hf, Ta, W, Re, Pt, Nb, and Mo; and
(b) a light component chosen from the group consisting of Si, Mg, and B.

Especially preferred are Hf:Mg, Ta:Mg, and W:Mg.

The following pairs are useful in the 23.6 Angstroms to 67.6 Angstrom (oxygen to boron) range:

(a) a metal chosen from the group consisting of Hf, Ta, W, Re, Pt, Cr, Co, Cu, Ni, and Mn; and
(b) a light component chosen from the group consisting of Si and Mg.

Especially preferred are Hf:Mg, Ta:Mg, Cr:Si; Cr:Mg; Co:Si; Cu:Si; and Ni:Si.

The following pairs are useful in the 44.7 Angstrom to 118 Angstrom (carbon to berylium) range:

(a) a metal chosen from the group consisting of Hf, Ta, Pt, Cr, W, Co, Cu, Ni, and Mn, and a light component chosen from the group consisting of Si, Mg, C, Ti, and V;
(b) W:B
(c) Re:Si; Re:Mg; Re:C;
(d) Nb:Si, Nb:Mg; and Wb-V
(e) Mo-Si;
(f) Ti and Si, Mg, C, or V;
(g) V:Mg; V:C; V:Ti;
(h) Fe:Si, Fe:C, Fe-Ti, and Fe-V.

Especially preferred are Co:Si, Cu-V, Ni-Si, Mn:V, Ti:V, and Fe:Si.

The following pairs are useful in the 67.6 to 118 Angstrom (Boron to Berylium) range:

(a) a metal chosen from Hf, Ti, W, Pt, W, Nb, Mo, Cr, Co, Cu, Ni, Mn, Ti, V, and Fe; and
(b) a light component chosen from the group consisting of Si, Mg, C, B, B$_4$C, Ti, and V.

Especially preferred are: Hf-Mg; Hf-Ti; Ta-Ti; Ta-V; W-B, W-V; Re-B, Pt-B; Pt-V; Nb-B; Nb-Ti; Nb-V; Mo-Si; Mo-Mg; Mo-Ti; Mo-V; Ti-V; and V-mg.

TABLE 5A

| | | 3 | 4 | 5 | 6 | 7 | 8 | 9 | 10 | 11 |
|---|---|---|---|---|---|---|---|---|---|---|
| | | | | Range 1 | | | | Range 4 | | |
| | | | | | Range 2 | | | | Range 5 | |
| | 2 | | | | | Range 3 | | | | Range 6 |
| 1 | | | | Normalized | | | | | | |
| Element Pairs: | Si 7.13 | Al 8.34 | Mg 9.89 | Na 11.91 | F 18.3 | O 23.6 | N 31.6 | C 44.7 | B 67.6 | Be 118 |
| Hf—Si | 0.047 | 0.260 | 0.261 | 0.220 | 0.128 | 0.084 | 0.056 | 0.031 | 0.020 | 0.101 |
| Hf—Mg | 0.047 | 0.234 | 0.328 | 0.267 | 0.160 | 0.112 | 0.082 | 0.051 | 0.023 | 0.152 |
| Hf—C | 0.029 | 0.201 | 0.212 | 0.181 | 0.102 | 0.064 | 0.044 | 0.101 | 0.018 | 0.042 |
| Hf—B | 0.039 | 0.248 | 0.254 | 0.217 | 0.127 | 0.082 | 0.054 | 0.032 | 0.092 | 0.022 |
| Hf—B$_4$C | 0.037 | 0.239 | 0.246 | 0.209 | 0.121 | 0.079 | 0.052 | 0.043 | 0.077 | 0.152 |
| Hf—Ti | 0.002 | 0.075 | 0.095 | 0.085 | 0.056 | 0.056 | 0.084 | 0.035 | 0.000 | 0.152 |
| Hf—V | 0.018 | 0.013 | 0.041 | 0.043 | 0.039 | 0.073 | 0.049 | 0.010 | 0.024 | 0.011 |
| Ta—Si | 0.036 | 0.309 | 0.287 | 0.239 | 0.140 | 0.098 | 0.067 | 0.039 | 0.027 | 0.025 |
| Ta—Mg | 0.031 | 0.279 | 0.338 | 0.275 | 0.165 | 0.120 | 0.088 | 0.056 | 0.031 | 0.000 |
| Ta—C | 0.056 | 0.262 | 0.249 | 0.208 | 0.119 | 0.081 | 0.056 | 0.096 | 0.029 | 0.816 |
| Ta—B | 0.046 | 0.300 | 0.282 | 0.237 | 0.139 | 0.097 | 0.065 | 0.040 | 0.091 | 1.000 |
| Ta—B$_4$C | 0.048 | 0.293 | 0.275 | 0.231 | 0.135 | 0.094 | 0.063 | 0.050 | 0.078 | 0.000 |
| Ta—Ti | 0.081 | 0.146 | 0.146 | 0.124 | 0.076 | 0.070 | 0.090 | 0.044 | 0.013 | 0.000 |
| Ta—V | 0.101 | 0.087 | 0.096 | 0.084 | 0.059 | 0.083 | 0.062 | 0.023 | 0.008 | 0.301 |

TABLE 5A-continued

| 1 Element Pairs: | 2 | 3 | 4 | 5 Range 1 | 6 Range 2 | 7 | 8 Range 3 | 9 Range 4 | 10 Range 5 Range 6 | 11 |
|---|---|---|---|---|---|---|---|---|---|---|
| | | Si 7.13 | Al 8.34 | Mg 9.89 | Na 11.91 | F 18.3 | O 23.6 | N 31.6 | C 44.7 | B 67.6 | Be 118 |

| Element Pairs: | Si 7.13 | Al 8.34 | Mg 9.89 | Na 11.91 | F 18.3 | O 23.6 | N 31.6 | C 44.7 | B 67.6 | Be 118 |
|---|---|---|---|---|---|---|---|---|---|---|
| W—Si | 0.264 | 0.336 | 0.299 | 0.247 | 0.143 | 0.103 | 0.071 | 0.042 | 0.029 | 0.025 |
| W—Mg | 0.234 | 0.306 | 0.342 | 0.277 | 0.164 | 0.122 | 0.089 | 0.056 | 0.033 | 0.000 |
| W—C | 0.210 | 0.296 | 0.267 | 0.221 | 0.126 | 0.088 | 0.061 | 0.090 | 0.031 | 0.816 |
| W—B | 0.243 | 0.329 | 0.295 | 0.245 | 0.143 | 0.102 | 0.069 | 0.043 | 0.087 | 1.000 |
| W—B4C | 0.237 | 0.322 | 0.290 | 0.240 | 0.139 | 0.099 | 0.068 | 0.051 | 0.076 | 0.000 |
| W—Ti | 0.110 | 0.191 | 0.175 | 0.145 | 0.086 | 0.077 | 0.090 | 0.046 | 0.016 | 0.000 |
| W—V | 0.053 | 0.136 | 0.129 | 0.108 | 0.071 | 0.088 | 0.066 | 0.028 | 0.004 | 0.301 |
| Re—Si | 0.427 | 0.380 | 0.321 | 0.260 | 0.150 | 0.105 | 0.082 | 0.048 | 0.041 | 0.025 |
| Re—Mg | 0.379 | 0.348 | 0.359 | 0.287 | 0.169 | 0.123 | 0.099 | 0.062 | 0.047 | 0.000 |
| Re—C | 0.378 | 0.345 | 0.293 | 0.237 | 0.134 | 0.092 | 0.072 | 0.093 | 0.049 | 0.816 |
| Re—B | 0.410 | 0.375 | 0.318 | 0.259 | 0.149 | 0.105 | 0.081 | 0.049 | 0.106 | 1.000 |
| Re—B4C | 0.404 | 0.369 | 0.313 | 0.254 | 0.146 | 0.102 | 0.079 | 0.057 | 0.094 | 0.000 |
| Re—Ti | 0.263 | 0.242 | 0.205 | 0.165 | 0.096 | 0.081 | 0.100 | 0.053 | 0.031 | 0.000 |
| Re—V | 0.200 | 0.188 | 0.160 | 0.130 | 0.081 | 0.091 | 0.078 | 0.036 | 0.011 | 0.301 |
| Pt—Si | 0.379 | 0.328 | 0.275 | 0.219 | 0.124 | 0.086 | 0.054 | 0.032 | 0.031 | 0.025 |
| Pt—Mg | 0.343 | 0.306 | 0.307 | 0.241 | 0.140 | 0.102 | 0.068 | 0.046 | 0.037 | 0.000 |
| Pt—C | 0.338 | 0.299 | 0.252 | 0.200 | 0.110 | 0.074 | 0.047 | 0.080 | 0.036 | 0.816 |
| Pt—B | 0.364 | 0.323 | 0.273 | 0.217 | 0.123 | 0.085 | 0.052 | 0.033 | 0.104 | 1.000 |
| Pt—B4C | 0.359 | 0.318 | 0.268 | 0.214 | 0.121 | 0.083 | 0.051 | 0.041 | 0.090 | 0.000 |
| Pt—Ti | 0.244 | 0.216 | 0.181 | 0.143 | 0.080 | 0.066 | 0.069 | 0.035 | 0.017 | 0.000 |
| Pt—V | 0.191 | 0.171 | 0.143 | 0.113 | 0.067 | 0.077 | 0.049 | 0.017 | 0.006 | 0.301 |
| Nb—Si | 0.551 | 0.425 | 0.332 | 0.250 | 0.124 | 0.075 | 0.031 | 0.022 | 0.051 | 0.025 |
| Nb—Mg | 0.416 | 0.348 | 0.420 | 0.308 | 0.158 | 0.103 | 0.053 | 0.007 | 0.076 | 0.000 |
| Nb—C | 0.425 | 0.342 | 0.269 | 0.203 | 0.096 | 0.055 | 0.023 | 0.051 | 0.118 | 0.816 |
| Nb—B | 0.510 | 0.412 | 0.326 | 0.247 | 0.122 | 0.073 | 0.029 | 0.020 | 0.472 | 1.000 |
| Nb—B4C | 0.493 | 0.398 | 0.314 | 0.238 | 0.117 | 0.069 | 0.028 | 0.010 | 0.393 | 0.000 |
| Nb—Ti | 0.178 | 0.146 | 0.116 | 0.089 | 0.049 | 0.050 | 0.055 | 0.029 | 0.026 | 0.000 |
| Nb—V | 0.072 | 0.063 | 0.052 | 0.042 | 0.033 | 0.068 | 0.023 | 0.058 | 0.037 | 0.301 |

TABLE 5B

| 1 Element Pairs: | 2 | 3 | 4 | 5 Range 1 | 6 Range 2 | 7 | 8 Range 3 | 9 Range 4 | 10 Range 5 Range 6 | 11 |
|---|---|---|---|---|---|---|---|---|---|---|
| | | Si 7.13 | Al 8.34 | Mg 9.89 | Na 11.91 | F 18.3 | O 23.6 | Ni 31.6 | C 44.7 | B 67.6 | Be 118 |

| Element Pairs: | Si 7.13 | Al 8.34 | Mg 9.89 | Na 11.91 | F 18.3 | O 23.6 | Ni 31.6 | C 44.7 | B 67.6 | Be 118 |
|---|---|---|---|---|---|---|---|---|---|---|
| Mo—Si | 0.561 | 0.439 | 0.343 | 0.260 | 0.128 | 0.070 | 0.034 | 0.015 | 0.075 | 0.233 |
| Mo—Mg | 0.446 | 0.371 | 0.413 | 0.306 | 0.155 | 0.091 | 0.054 | 0.001 | 0.114 | 0.912 |
| Mo—C | 0.461 | 0.372 | 0.292 | 0.222 | 0.105 | 0.055 | 0.026 | 0.061 | 0.200 | 0.252 |
| Mo—B | 0.529 | 0.429 | 0.338 | 0.258 | 0.126 | 0.068 | 0.032 | 0.013 | 0.559 | 0.188 |
| Mo—B4C | 0.516 | 0.418 | 0.328 | 0.250 | 0.122 | 0.066 | 0.031 | 0.003 | 0.479 | 0.912 |
| Mo—Ti | 0.243 | 0.197 | 0.155 | 0.120 | 0.062 | 0.050 | 0.056 | 0.021 | 0.075 | 0.912 |
| Mo—V | 0.143 | 0.119 | 0.094 | 0.074 | 0.046 | 0.066 | 0.027 | 0.050 | 0.003 | 0.081 |
| Cr—Si | 0.497 | 0.367 | 0.273 | 0.192 | 0.040 | 0.086 | 0.131 | 0.105 | 0.091 | 0.025 |
| Cr—Mg | 0.393 | 0.315 | 0.339 | 0.234 | 0.063 | 0.216 | 0.237 | 0.179 | 0.122 | 0.000 |
| Cr—C | 0.395 | 0.301 | 0.224 | 0.158 | 0.022 | 0.026 | 0.085 | 0.381 | 0.165 | 0.816 |
| Cr—B | 0.463 | 0.356 | 0.267 | 0.189 | 0.038 | 0.080 | 0.126 | 0.107 | 0.312 | 1.000 |
| Cr—B4C | 0.450 | 0.345 | 0.258 | 0.183 | 0.035 | 0.068 | 0.115 | 0.138 | 0.281 | 0.000 |
| Cr—Ti | 0.188 | 0.143 | 0.106 | 0.075 | 0.003 | 0.032 | 0.241 | 0.148 | 0.101 | 0.000 |
| Cr—V | 0.092 | 0.070 | 0.052 | 0.036 | 0.006 | 0.067 | 0.121 | 0.078 | 0.053 | 0.301 |
| Co—Si | 0.393 | 0.290 | 0.210 | 0.135 | 0.231 | 0.230 | 0.178 | 0.123 | 0.089 | 0.025 |
| Co—Mg | 0.340 | 0.267 | 0.249 | 0.159 | 0.369 | 0.349 | 0.259 | 0.176 | 0.109 | 0.000 |
| Co—C | 0.332 | 0.251 | 0.181 | 0.114 | 0.142 | 0.160 | 0.133 | 0.291 | 0.129 | 0.816 |
| Co—B | 0.371 | 0.283 | 0.206 | 0.133 | 0.232 | 0.234 | 0.176 | 0.125 | 0.209 | 1.000 |
| Co—B4C | 0.364 | 0.276 | 0.201 | 0.129 | 0.211 | 0.217 | 0.165 | 0.148 | 0.193 | 0.000 |
| Co—Ti | 0.203 | 0.151 | 0.107 | 0.063 | 0.036 | 0.100 | 0.261 | 0.157 | 0.094 | 0.000 |
| Co—V | 0.134 | 0.099 | 0.067 | 0.036 | 0.014 | 0.116 | 0.177 | 0.108 | 0.063 | 0.301 |
| Cu—Si | 0.316 | 0.228 | 0.149 | 0.085 | 0.291 | 0.213 | 0.162 | 0.114 | 0.071 | 0.025 |
| Cu—Mg | 0.281 | 0.216 | 0.180 | 0.106 | 0.416 | 0.302 | 0.226 | 0.158 | 0.084 | 0.000 |
| Cu—C | 0.267 | 0.196 | 0.127 | 0.067 | 0.205 | 0.156 | 0.124 | 0.250 | 0.094 | 0.816 |
| Cu—B | 0.298 | 0.221 | 0.145 | 0.082 | 0.295 | 0.215 | 0.159 | 0.116 | 0.154 | 1.000 |
| Cu—B4C | 0.292 | 0.216 | 0.142 | 0.079 | 0.274 | 0.202 | 0.151 | 0.135 | 0.142 | 0.000 |
| Cu—Ti | 0.167 | 0.120 | 0.072 | 0.027 | 0.073 | 0.104 | 0.228 | 0.141 | 0.070 | 0.000 |
| Cu—V | 0.110 | 0.077 | 0.041 | 0.005 | 0.043 | 0.118 | 0.159 | 0.100 | 0.046 | 0.301 |
| Ni—Si | 0.361 | 0.263 | 0.184 | 0.105 | 0.296 | 0.244 | 0.182 | 0.122 | 0.085 | 0.123 |
| Ni—Mg | 0.317 | 0.245 | 0.218 | 0.125 | 0.433 | 0.352 | 0.255 | 0.169 | 0.102 | 0.332 |
| Ni—C | 0.307 | 0.228 | 0.159 | 0.087 | 0.205 | 0.178 | 0.140 | 0.266 | 0.118 | 0.000 |
| Ni—B | 0.341 | 0.256 | 0.180 | 0.102 | 0.301 | 0.249 | 0.180 | 0.124 | 0.187 | 0.050 |
| Ni—B4C | 0.335 | 0.250 | 0.176 | 0.099 | 0.279 | 0.232 | 0.170 | 0.145 | 0.173 | 0.332 |

TABLE 5B-continued

| Element Pairs: | 2 | 3 | 4 | 5 Range 1 | 6 | 7 | 8 Range 4 | 9 | 10 Range 5 | 11 |
|---|---|---|---|---|---|---|---|---|---|---|
| | | | | | Range 2 | | | | | |
| | | | | | | Range 3 | | | | Range 6 |
| | | Normalized (absolute difference of deltas)/(sum of betas) | | | | | | | | |
| | Si 7.13 | Al 8.34 | Mg 9.89 | Na 11.91 | F 18.3 | O 23.6 | Ni 31.6 | C 44.7 | B 67.6 | Be 118 |
| Ni—Ti | 0.195 | 0.143 | 0.096 | 0.046 | 0.069 | 0.113 | 0.257 | 0.151 | 0.088 | 0.332 |
| Ni—V | 0.133 | 0.095 | 0.061 | 0.023 | 0.040 | 0.125 | 0.181 | 0.109 | 0.061 | 0.041 |
| Mn—Si | 0.470 | 0.350 | 0.261 | 0.182 | 0.008 | 0.168 | 0.165 | 0.125 | 0.101 | 0.025 |
| Mn—Mg | 0.389 | 0.310 | 0.314 | 0.214 | 0.026 | 0.301 | 0.265 | 0.195 | 0.132 | 0.000 |
| Mn—C | 0.389 | 0.298 | 0.222 | 0.153 | 0.006 | 0.098 | 0.115 | 0.364 | 0.172 | 0.816 |
| Mn—B | 0.443 | 0.341 | 0.256 | 0.179 | 0.005 | 0.169 | 0.162 | 0.127 | 0.295 | 1.000 |
| Mn—B4C | 0.432 | 0.333 | 0.249 | 0.173 | 0.003 | 0.152 | 0.150 | 0.156 | 0.270 | 0.000 |
| Mn—Ti | 0.217 | 0.165 | 0.122 | 0.083 | 0.017 | 0.066 | 0.268 | 0.169 | 0.115 | 0.000 |
| Mn—V | 0.132 | 0.100 | 0.073 | 0.048 | 0.022 | 0.091 | 0.161 | 0.106 | 0.071 | 0.301 |

TABLE 5C

| Element Pairs: | 2 | 3 | 4 | 5 Range 1 | 6 | 7 | 8 | 9 Range 4 | 10 Range 5 | 11 |
|---|---|---|---|---|---|---|---|---|---|---|
| | | | | | Range 2 | | | | | |
| | | | | | | Range 3 | | | | Range 6 |
| | | Normalized (absolute difference of deltas)/(sum of betas) | | | | | | | | |
| | Si 7.13 | Al 8.34 | Mg 9.89 | Na 11.91 | F 18.3 | O 23.6 | N 31.6 | C 44.7 | B 67.6 | Be 118 |
| Ti—Si | 0.458 | 0.326 | 0.239 | 0.171 | 0.060 | 0.002 | 0.072 | 0.002 | 0.036 | 0.025 |
| Ti—Mg | 0.307 | 0.257 | 0.370 | 0.251 | 0.100 | 0.027 | 0.010 | 0.057 | 0.051 | 0.000 |
| Ti—C | 0.265 | 0.203 | 0.151 | 0.107 | 0.030 | 0.019 | 0.063 | 0.346 | 0.062 | 0.816 |
| Ti—B | 0.388 | 0.302 | 0.227 | 0.163 | 0.056 | 0.006 | 0.084 | 0.007 | 0.350 | 1.000 |
| Ti—B4C | 0.363 | 0.281 | 0.211 | 0.151 | 0.051 | 0.008 | 0.078 | 0.034 | 0.287 | 0.000 |
| Ti—V | 0.103 | 0.079 | 0.060 | 0.043 | 0.010 | 0.029 | 0.132 | 0.077 | 0.054 | 0.301 |
| V—Si | 0.490 | 0.359 | 0.267 | 0.190 | 0.061 | 0.044 | 0.031 | 0.051 | 0.063 | 0.135 |
| V—Mg | 0.359 | 0.294 | 0.362 | 0.249 | 0.090 | 0.027 | 0.125 | 0.120 | 0.089 | 0.301 |
| V—C | 0.348 | 0.267 | 0.201 | 0.142 | 0.038 | 0.054 | 0.008 | 0.373 | 0.126 | 0.054 |
| V—B | 0.441 | 0.342 | 0.258 | 0.185 | 0.058 | 0.048 | 0.023 | 0.055 | 0.342 | 0.016 |
| V—B4C | 0.423 | 0.327 | 0.246 | 0.176 | 0.054 | 0.049 | 0.019 | 0.085 | 0.296 | 0.301 |
| V—Ti | 0.103 | 0.079 | 0.060 | 0.043 | 0.010 | 0.029 | 0.132 | 0.077 | 0.054 | 0.301 |
| Fe—Si | 0.418 | 0.311 | 0.227 | 0.154 | 0.023 | 0.183 | 0.156 | 0.113 | 0.087 | 0.108 |
| Fe—Mg | 0.351 | 0.279 | 0.275 | 0.184 | 0.134 | 0.311 | 0.247 | 0.173 | 0.110 | 0.160 |
| Fe—C | 0.343 | 0.262 | 0.192 | 0.128 | 0.042 | 0.113 | 0.110 | 0.316 | 0.136 | 0.057 |
| Fe—B | 0.391 | 0.301 | 0.222 | 0.151 | 0.009 | 0.185 | 0.153 | 0.115 | 0.238 | 0.039 |
| Fe—B4C | 0.382 | 0.294 | 0.216 | 0.146 | 0.003 | 0.168 | 0.142 | 0.141 | 0.217 | 0.160 |
| Fe—Ti | 0.189 | 0.143 | 0.103 | 0.067 | 0.047 | 0.074 | 0.250 | 0.149 | 0.093 | 0.160 |
| Fe—V | 0.111 | 0.083 | 0.058 | 0.035 | 0.050 | 0.097 | 0.152 | 0.093 | 0.056 | 0.025 |

TABLE 6A

| Element Pairs: | 12 | 13 | 14 Fluorescences in Wavelength Range: | 15 | 16 | 17 |
|---|---|---|---|---|---|---|
| | 1 | 2 | 3 | 4 | 5 | 6 |
| Hf—Si | 1 | 1 | 1 | 1 | 1 | 1 |
| Hf—Mg | 1 | 1 | 1 | 1 | 1 | 1 |
| Hf—C | 1 | 1 | 0 | 0 | 1 | 1 |
| Hf—B | 1 | 1 | 1 | 0 | 0 | 1 |
| Hf—B4C | 1 | 1 | 0 | 0 | 0 | 1 |
| Hf—Ti | 1 | 0 | 0 | 0 | 1 | 1 |
| Hf—V | 1 | 0 | 0 | 0 | 1 | 1 |
| Ta—Si | 1 | 1 | 1 | 1 | 1 | 1 |
| Ta—Mg | 1 | 1 | 1 | 1 | 1 | 1 |
| Ta—C | 1 | 1 | 0 | 0 | 1 | 1 |
| Ta—B | 1 | 1 | 1 | 0 | 0 | 1 |
| Ta—B4C | 1 | 1 | 0 | 0 | 0 | 1 |
| Ta—Ti | 1 | 0 | 0 | 0 | 1 | 1 |
| Ta—V | 1 | 0 | 0 | 0 | 1 | 1 |
| W—Si | 1 | 1 | 1 | 1 | 1 | 1 |
| W—Mg | 1 | 1 | 1 | 1 | 1 | 1 |
| W—C | 1 | 1 | 0 | 0 | 1 | 1 |
| W—B | 1 | 1 | 1 | 0 | 1 | 1 |
| W—B4C | 1 | 1 | 0 | 0 | 0 | 1 |
| W—Ti | 1 | 0 | 0 | 0 | 1 | 1 |
| W—V | 1 | 0 | 0 | 0 | 1 | 1 |
| Re—Si | 1 | 1 | 1 | 1 | 1 | 1 |
| Re—Mg | 1 | 1 | 1 | 1 | 1 | 1 |
| Re—C | 1 | 1 | 0 | 0 | 1 | 1 |
| Re—B | 1 | 1 | 1 | 0 | 0 | 1 |
| Re—B4C | 1 | 1 | 0 | 0 | 0 | 1 |
| Re—Ti | 1 | 0 | 0 | 0 | 1 | 1 |
| Re—V | 1 | 0 | 0 | 0 | 1 | 1 |
| Pt—Si | 1 | 1 | 1 | 1 | 1 | 1 |
| Pt—Mg | 1 | 1 | 1 | 1 | 1 | 1 |
| Pt—C | 1 | 1 | 0 | 0 | 1 | 1 |
| Pt—B | 1 | 1 | 1 | 0 | 0 | 1 |
| Pt—B4C | 1 | 1 | 0 | 0 | 0 | 1 |
| Pt—Ti | 1 | 0 | 0 | 0 | 1 | 1 |
| Pt—V | 1 | 0 | 0 | 0 | 1 | 1 |
| Nb—Si | 1 | 1 | 1 | 0 | 1 | 1 |
| Nb—Mg | 1 | 1 | 1 | 0 | 1 | 1 |
| Nb—C | 1 | 1 | 0 | 0 | 0 | 1 |
| Nb—B | 1 | 1 | 1 | 0 | 0 | 1 |
| Nb—B4C | 1 | 1 | 0 | 0 | 0 | 1 |
| Nb—Ti | 1 | 0 | 0 | 0 | 0 | 1 |
| Nb—V | 1 | 0 | 0 | 0 | 1 | 1 |

TABLE 6B

| Element Pairs: | Fluorescences in Wavelength Range: | | | | | |
|---|---|---|---|---|---|---|
| | 1 | 2 | 3 | 4 | 5 | 6 |
| Mo—Si | 1 | 1 | 1 | 0 | 1 | 1 |
| Mo—Mg | 1 | 1 | 1 | 0 | 0 | 1 |
| Mo—C | 1 | 1 | 0 | 0 | 0 | 1 |
| Mo—B | 1 | 1 | 1 | 0 | 0 | 1 |
| Mo—B4C | 1 | 1 | 0 | 0 | 0 | 1 |
| Mo—Ti | 1 | 0 | 0 | 0 | 0 | 1 |
| Mo—V | 1 | 0 | 0 | 0 | 0 | 1 |
| Cr—Si | 0 | 0 | 0 | 1 | 1 | 1 |
| Cr—Mg | 0 | 0 | 0 | 1 | 1 | 1 |
| Cr—C | 0 | 0 | 0 | 0 | 1 | 1 |
| Cr—B | 0 | 0 | 0 | 0 | 0 | 1 |
| Cr—B4C | 0 | 0 | 0 | 0 | 0 | 1 |
| Cr—Ti | 0 | 0 | 0 | 0 | 1 | 1 |
| Cr—V | 0 | 0 | 0 | 0 | 1 | 1 |
| Co—Si | 0 | 0 | 0 | 1 | 1 | 1 |
| Co—Mg | 0 | 0 | 0 | 1 | 1 | 1 |
| Co—C | 0 | 0 | 0 | 0 | 1 | 1 |
| Co—B | 0 | 0 | 0 | 0 | 0 | 1 |
| Co—B4C | 0 | 0 | 0 | 0 | 0 | 1 |
| Co—Ti | 0 | 0 | 0 | 0 | 1 | 1 |
| Co—V | 0 | 0 | 0 | 0 | 1 | 1 |
| Cu—Si | 0 | 0 | 0 | 1 | 1 | 1 |
| Cu—Mg | 0 | 0 | 0 | 1 | 1 | 1 |
| Cu—C | 0 | 0 | 0 | 0 | 1 | 1 |
| Cu—B | 0 | 0 | 0 | 0 | 0 | 1 |
| Cu—B4C | 0 | 0 | 0 | 0 | 0 | 1 |
| Cu—Ti | 0 | 0 | 0 | 0 | 1 | 1 |
| Cu—V | 0 | 0 | 0 | 0 | 1 | 1 |
| Ni—Si | 0 | 0 | 0 | 1 | 1 | 1 |
| Ni—Mg | 0 | 0 | 0 | 1 | 1 | 1 |
| Ni—C | 0 | 0 | 0 | 0 | 1 | 1 |
| Ni—B | 0 | 0 | 0 | 0 | 0 | 1 |
| Ni—B4C | 0 | 0 | 0 | 0 | 0 | 1 |
| Ni—Ti | 0 | 0 | 0 | 0 | 1 | 1 |
| Ni—V | 0 | 0 | 0 | 0 | 1 | 1 |
| Mn—Si | 0 | 0 | 0 | 1 | 1 | 1 |
| Mn—Mg | 0 | 0 | 0 | 1 | 1 | 1 |
| Mn—C | 0 | 0 | 0 | 0 | 1 | 1 |
| Mn—B | 0 | 0 | 0 | 0 | 0 | 1 |
| Mn—B4C | 0 | 0 | 0 | 0 | 0 | 1 |
| Mn—Ti | 0 | 0 | 0 | 0 | 1 | 1 |
| Mn—V | 0 | 0 | 0 | 0 | 1 | 1 |

TABLE 6C

| Element Pairs: | Fluorescences in Wavelength Range: | | | | | |
|---|---|---|---|---|---|---|
| | 1 | 2 | 3 | 4 | 5 | 6 |
| Ti—Si | 1 | 0 | 0 | 0 | 1 | 1 |
| Ti—Mg | 1 | 0 | 0 | 0 | 1 | 1 |
| Ti—C | 1 | 0 | 0 | 0 | 1 | 1 |
| Ti—B | 1 | 0 | 0 | 0 | 0 | 1 |
| Ti—B4C | 1 | 0 | 0 | 0 | 0 | 1 |
| Ti—V | 1 | 0 | 0 | 0 | 1 | 1 |
| V—Si | 1 | 0 | 0 | 0 | 1 | 1 |
| V—Mg | 1 | 0 | 0 | 0 | 1 | 1 |
| V—C | 1 | 0 | 0 | 0 | 1 | 1 |
| V—B | 1 | 0 | 0 | 0 | 0 | 1 |
| V—B4C | 1 | 0 | 0 | 0 | 0 | 1 |
| V—Ti | 1 | 0 | 0 | 0 | 1 | 1 |
| Fe—Si | 0 | 0 | 0 | 0 | 1 | 1 |
| Fe—Mg | 0 | 0 | 0 | 0 | 1 | 1 |
| Fe—C | 0 | 0 | 0 | 0 | 1 | 1 |
| Fe—B | 0 | 0 | 0 | 0 | 0 | 1 |
| Fe—B4C | 0 | 0 | 0 | 0 | 0 | 1 |
| Fe—Ti | 0 | 0 | 0 | 0 | 1 | 1 |
| Fe—V | 0 | 0 | 0 | 0 | 1 | 1 |

TABLE 7A

| Element Pairs: | Normalized | | | |
|---|---|---|---|---|
| | Covalent Radius | Bond Length | Electro-Negativity | Chemical Stability |
| Hf—Si | 0.493 | 0.491 | 0.385 | 0.544 |
| Hf—Mg | 0.119 | 0.252 | 0.077 | 0.851 |
| Hf—C | 1.000 | 1.000 | 0.923 | 0.026 |
| Hf—B | 0.925 | 0.969 | 0.538 | 0.189 |
| Hf—B4C | 0.940 | 0.975 | 0.615 | 0.157 |
| Hf—Ti | 0.179 | 0.145 | 0.154 | 0.841 |
| Hf—V | 0.328 | 0.321 | 0.231 | 0.707 |
| Ta—Si | 0.343 | 0.321 | 0.231 | 0.702 |
| Ta—Mg | 0.030 | 0.082 | 0.231 | 0.886 |
| Ta—C | 0.851 | 0.830 | 0.769 | 0.183 |
| Ta—B | 0.776 | 0.799 | 0.385 | 0.347 |
| Ta—B4C | 0.791 | 0.805 | 0.462 | 0.314 |
| Ta—Ti | 0.030 | 0.025 | 0.000 | 0.982 |
| Ta—V | 0.179 | 0.151 | 0.077 | 0.864 |
| W—Si | 0.284 | 0.245 | 0.077 | 0.798 |
| W—Mg | 0.090 | 0.006 | 0.385 | 0.840 |
| W—C | 0.791 | 0.755 | 0.615 | 0.280 |
| W—B | 0.716 | 0.723 | 0.231 | 0.443 |
| W—B4C | 0.731 | 0.730 | 0.308 | 0.410 |
| W—Ti | 0.030 | 0.101 | 0.154 | 0.905 |
| W—V | 0.119 | 0.075 | 0.077 | 0.910 |
| Re—Si | 0.254 | 0.245 | 0.077 | 0.808 |
| Re—Mg | 0.119 | 0.006 | 0.538 | 0.779 |
| Re—C | 0.761 | 0.755 | 0.462 | 0.341 |
| Re—B | 0.687 | 0.723 | 0.077 | 0.504 |
| Re—B4C | 0.701 | 0.730 | 0.154 | 0.472 |
| Re—Ti | 0.060 | 0.101 | 0.308 | 0.844 |
| Re—V | 0.090 | 0.075 | 0.231 | 0.868 |
| Pt—Si | 0.284 | 0.252 | 0.308 | 0.719 |
| Pt—Mg | 0.090 | 0.013 | 0.769 | 0.709 |
| Pt—C | 0.791 | 0.761 | 0.231 | 0.406 |
| Pt—B | 0.716 | 0.730 | 0.154 | 0.467 |
| Pt—B4C | 0.731 | 0.736 | 0.077 | 0.485 |
| Pt—Ti | 0.030 | 0.094 | 0.538 | 0.779 |
| Pt—V | 0.119 | 0.082 | 0.462 | 0.779 |
| Nb—Si | 0.343 | 0.321 | 0.000 | 0.779 |
| Nb—Mg | 0.030 | 0.082 | 0.462 | 0.809 |
| Nb—C | 0.851 | 0.830 | 0.538 | 0.260 |
| Nb—B | 0.776 | 0.799 | 0.154 | 0.424 |
| Nb—B4C | 0.791 | 0.805 | 0.231 | 0.391 |
| Nb—Ti | 0.030 | 0.025 | 0.231 | 0.905 |
| Nb—V | 0.179 | 0.151 | 0.154 | 0.839 |

TABLE 7B

| Element Pairs: | Normalized | | | |
|---|---|---|---|---|
| | Covalent Radius | Bond Length | Electro-Negativity | Chemical Stability |
| Mo—Si | 0.284 | 0.239 | 0.000 | 0.826 |
| Mo—Mg | 0.090 | 0.000 | 0.462 | 0.816 |
| Mo—C | 0.791 | 0.748 | 0.538 | 0.308 |
| Mo—B | 0.716 | 0.717 | 0.154 | 0.471 |
| Mo—B4C | 0.731 | 0.723 | 0.231 | 0.438 |
| Mo—Ti | 0.030 | 0.107 | 0.231 | 0.877 |
| Mo—V | 0.119 | 0.069 | 0.154 | 0.886 |
| Cr—Si | 0.104 | 0.094 | 0.154 | 0.883 |
| Cr—Mg | 0.269 | 0.145 | 0.308 | 0.759 |
| Cr—C | 0.612 | 0.604 | 0.692 | 0.364 |
| Cr—B | 0.537 | 0.572 | 0.308 | 0.528 |
| Cr—B4C | 0.552 | 0.579 | 0.385 | 0.495 |
| Cr—Ti | 0.209 | 0.252 | 0.077 | 0.821 |
| Cr—V | 0.060 | 0.075 | 0.000 | 0.955 |
| Co—Si | 0.075 | 0.101 | 0.000 | 0.941 |
| Co—Mg | 0.299 | 0.138 | 0.462 | 0.700 |
| Co—C | 0.582 | 0.610 | 0.538 | 0.423 |
| Co—B | 0.507 | 0.579 | 0.154 | 0.587 |
| Co—B4C | 0.522 | 0.585 | 0.231 | 0.554 |
| Co—Ti | 0.239 | 0.245 | 0.231 | 0.762 |
| Co—V | 0.090 | 0.069 | 0.154 | 0.896 |
| Cu—Si | 0.090 | 0.132 | 0.077 | 0.900 |
| Cu—Mg | 0.284 | 0.107 | 0.538 | 0.690 |
| Cu—C | 0.597 | 0.642 | 0.462 | 0.433 |
| Cu—B | 0.522 | 0.610 | 0.077 | 0.597 |
| Cu—B4C | 0.537 | 0.616 | 0.154 | 0.564 |
| Cu—Ti | 0.224 | 0.214 | 0.308 | 0.751 |

TABLE 7B-continued

| Element Pairs: | 18 Covalent Radius | 19 Bond Length | 20 Normalized Electro-Negativity | 21 Chemical Stability |
|---|---|---|---|---|
| Cu—V | 0.075 | 0.038 | 0.231 | 0.885 |
| Ni—Si | 0.060 | 0.088 | 0.000 | 0.951 |
| Ni—Mg | 0.313 | 0.151 | 0.462 | 0.691 |
| Ni—C | 0.567 | 0.597 | 0.538 | 0.433 |
| Ni—B | 0.493 | 0.566 | 0.154 | 0.596 |
| Ni—B4C | 0.507 | 0.572 | 0.231 | 0.563 |
| Ni—Ti | 0.254 | 0.258 | 0.231 | 0.752 |
| Ni—V | 0.104 | 0.082 | 0.154 | 0.887 |
| Mn—Si | 0.090 | 0.239 | 0.231 | 0.813 |
| Mn—Mg | 0.284 | 0.000 | 0.231 | 0.828 |
| Mn—C | 0.597 | 0.748 | 0.769 | 0.295 |
| Mn—B | 0.522 | 0.717 | 0.385 | 0.459 |
| Mn—B4C | 0.537 | 0.723 | 0.462 | 0.426 |
| Mn—Ti | 0.224 | 0.107 | 0.000 | 0.890 |
| Mn—V | 0.075 | 0.069 | 0.077 | 0.926 |

TABLE 7C

| Element Pairs: | 18 Covalent Radius | 19 Bond Length | 20 Normalized Electro-Negativity | 21 Chemical Stability |
|---|---|---|---|---|
| Ti—Si | 0.313 | 0.346 | 0.231 | 0.703 |
| Ti—Mg | 0.060 | 0.107 | 0.231 | 0.867 |
| Ti—C | 0.821 | 0.855 | 0.769 | 0.185 |
| Ti—B | 0.746 | 0.824 | 0.385 | 0.348 |
| Ti—B4C | 0.761 | 0.830 | 0.462 | 0.316 |
| Ti—V | 0.149 | 0.176 | 0.077 | 0.866 |
| V—Si | 0.164 | 0.170 | 0.154 | 0.837 |
| V—Mg | 0.209 | 0.069 | 0.308 | 0.805 |
| V—C | 0.672 | 0.679 | 0.692 | 0.319 |
| V—B | 0.597 | 0.648 | 0.308 | 0.482 |
| V—B4C | 0.612 | 0.654 | 0.385 | 0.450 |
| V—Ti | 0.149 | 0.176 | 0.077 | 0.866 |
| Fe—Si | 0.090 | 0.082 | 0.000 | 0.943 |
| Fe—Mg | 0.284 | 0.157 | 0.462 | 0.699 |
| Fe—C | 0.597 | 0.591 | 0.538 | 0.425 |
| Fe—B | 0.522 | 0.560 | 0.154 | 0.588 |
| Fe—B4C | 0.537 | 0.566 | 0.231 | 0.555 |
| Fe—Ti | 0.224 | 0.264 | 0.231 | 0.760 |
| Fe—V | 0.075 | 0.088 | 0.154 | 0.894 |

TABLE 8A

| Element Pairs: | 22 | 23 | 24 | 25 | 26 | 27 |
|---|---|---|---|---|---|---|
| | \multicolumn{6}{c}{(absolute difference of deltas)/(sum of betas) Normalized in each Wavelength Range:} | | | | | |
| | 1 | 2 | 3 | 4 | 5 | 6 |
| Hf—Si | 0.217 | 0.122 | 0.075 | 0.048 | 0.050 | 0.550 |
| Hf—Mg | 0.247 | 0.155 | 0.101 | 0.067 | 0.075 | 0.576 |
| Hf—C | 0.174 | 0.098 | 0.078 | 0.057 | 0.053 | 0.521 |
| Hf—B | 0.211 | 0.120 | 0.074 | 0.065 | 0.049 | 0.511 |
| Hf—B4C | 0.204 | 0.115 | 0.074 | 0.063 | 0.091 | 0.576 |
| Hf—Ti | 0.078 | 0.070 | 0.058 | 0.044 | 0.062 | 0.576 |
| Hf—V | 0.034 | 0.051 | 0.043 | 0.039 | 0.015 | 0.505 |
| Ta—Si | 0.244 | 0.136 | 0.086 | 0.058 | 0.031 | 0.513 |
| Ta—Mg | 0.264 | 0.162 | 0.107 | 0.074 | 0.029 | 0.500 |
| Ta—C | 0.209 | 0.116 | 0.088 | 0.066 | 0.314 | 0.908 |
| Ta—B | 0.239 | 0.134 | 0.085 | 0.073 | 0.377 | 1.000 |
| Ta—B4C | 0.233 | 0.130 | 0.085 | 0.071 | 0.043 | 0.500 |
| Ta—Ti | 0.123 | 0.090 | 0.070 | 0.054 | 0.019 | 0.500 |
| Ta—V | 0.081 | 0.072 | 0.057 | 0.044 | 0.111 | 0.650 |
| W—Si | 0.256 | 0.141 | 0.090 | 0.061 | 0.032 | 0.513 |
| W—Mg | 0.272 | 0.163 | 0.108 | 0.075 | 0.030 | 0.500 |
| W—C | 0.228 | 0.124 | 0.091 | 0.068 | 0.312 | 0.908 |
| W—B | 0.253 | 0.140 | 0.089 | 0.075 | 0.377 | 1.000 |
| W—B4C | 0.248 | 0.136 | 0.089 | 0.073 | 0.042 | 0.500 |
| W—Ti | 0.149 | 0.100 | 0.075 | 0.057 | 0.021 | 0.500 |
| W—V | 0.111 | 0.083 | 0.063 | 0.047 | 0.111 | 0.650 |
| Re—Si | 0.278 | 0.149 | 0.096 | 0.069 | 0.038 | 0.513 |
| Re—Mg | 0.290 | 0.169 | 0.113 | 0.083 | 0.037 | 0.500 |
| Re—C | 0.252 | 0.134 | 0.098 | 0.077 | 0.319 | 0.908 |
| Re—B | 0.275 | 0.148 | 0.096 | 0.085 | 0.385 | 1.000 |
| Re—B4C | 0.270 | 0.145 | 0.096 | 0.083 | 0.050 | 0.500 |
| Re—Ti | 0.177 | 0.111 | 0.083 | 0.066 | 0.028 | 0.500 |
| Re—V | 0.140 | 0.095 | 0.071 | 0.054 | 0.116 | 0.650 |
| Pt—Si | 0.237 | 0.121 | 0.074 | 0.051 | 0.030 | 0.513 |
| Pt—Mg | 0.249 | 0.138 | 0.089 | 0.063 | 0.028 | 0.500 |
| Pt—C | 0.215 | 0.108 | 0.078 | 0.059 | 0.311 | 0.908 |
| Pt—B | 0.234 | 0.119 | 0.073 | 0.068 | 0.379 | 1.000 |
| Pt—B4C | 0.230 | 0.117 | 0.074 | 0.066 | 0.044 | 0.500 |
| Pt—Ti | 0.155 | 0.089 | 0.063 | 0.047 | 0.017 | 0.500 |
| Pt—V | 0.123 | 0.077 | 0.053 | 0.037 | 0.108 | 0.650 |
| Nb—Si | 0.283 | 0.120 | 0.063 | 0.045 | 0.033 | 0.513 |
| Nb—Mg | 0.308 | 0.156 | 0.080 | 0.060 | 0.028 | 0.500 |
| Nb—C | 0.227 | 0.094 | 0.056 | 0.062 | 0.329 | 0.908 |
| Nb—B | 0.277 | 0.118 | 0.061 | 0.149 | 0.497 | 1.000 |
| Nb—B4C | 0.266 | 0.113 | 0.056 | 0.125 | 0.134 | 0.500 |
| Nb—Ti | 0.100 | 0.061 | 0.046 | 0.040 | 0.019 | 0.500 |
| Nb—V | 0.048 | 0.041 | 0.046 | 0.047 | 0.132 | 0.650 |

TABLE 8B

| Element Pairs: | 22 | 23 | 24 | 25 | 26 | 27 |
|---|---|---|---|---|---|---|
| | \multicolumn{6}{c}{(absolute difference of deltas)/(sum of betas) Normalized in each Wavelength Range:} | | | | | |
| | 1 | 2 | 3 | 4 | 5 | 6 |
| Mo—Si | 0.292 | 0.123 | 0.062 | 0.049 | 0.108 | 0.617 |
| Mo—Mg | 0.311 | 0.152 | 0.075 | 0.065 | 0.342 | 0.956 |
| Mo—C | 0.248 | 0.102 | 0.062 | 0.085 | 0.171 | 0.626 |
| Mo—B | 0.288 | 0.121 | 0.060 | 0.168 | 0.253 | 0.594 |
| Mo—B4C | 0.280 | 0.117 | 0.055 | 0.145 | 0.464 | 0.956 |
| Mo—Ti | 0.133 | 0.072 | 0.047 | 0.050 | 0.336 | 0.956 |
| Mo—V | 0.083 | 0.053 | 0.047 | 0.036 | 0.045 | 0.541 |
| Cr—Si | 0.218 | 0.112 | 0.091 | 0.103 | 0.074 | 0.013 |
| Cr—Mg | 0.238 | 0.187 | 0.174 | 0.188 | 0.100 | 0.000 |
| Cr—C | 0.176 | 0.073 | 0.128 | 0.164 | 0.454 | 0.408 |
| Cr—B | 0.212 | 0.108 | 0.088 | 0.157 | 0.473 | 0.500 |
| Cr—B4C | 0.205 | 0.100 | 0.089 | 0.151 | 0.140 | 0.000 |
| Cr—Ti | 0.082 | 0.088 | 0.106 | 0.131 | 0.083 | 0.000 |
| Cr—V | 0.041 | 0.057 | 0.068 | 0.079 | 0.144 | 0.150 |
| Co—Si | 0.216 | 0.194 | 0.191 | 0.155 | 0.079 | 0.013 |
| Co—Mg | 0.261 | 0.284 | 0.288 | 0.223 | 0.095 | 0.000 |
| Co—C | 0.172 | 0.137 | 0.181 | 0.178 | 0.412 | 0.408 |
| Co—B | 0.213 | 0.194 | 0.192 | 0.186 | 0.445 | 0.500 |
| Co—B4C | 0.204 | 0.180 | 0.185 | 0.181 | 0.114 | 0.000 |
| Co—Ti | 0.089 | 0.115 | 0.139 | 0.153 | 0.084 | 0.000 |
| Co—V | 0.054 | 0.086 | 0.104 | 0.116 | 0.157 | 0.150 |
| Cu—Si | 0.188 | 0.188 | 0.195 | 0.140 | 0.070 | 0.013 |
| Cu—Mg | 0.230 | 0.263 | 0.276 | 0.193 | 0.081 | 0.000 |
| Cu—C | 0.149 | 0.138 | 0.184 | 0.156 | 0.387 | 0.408 |
| Cu—B | 0.186 | 0.188 | 0.196 | 0.161 | 0.423 | 0.500 |
| Cu—B4C | 0.178 | 0.177 | 0.191 | 0.158 | 0.092 | 0.000 |
| Cu—Ti | 0.073 | 0.108 | 0.136 | 0.136 | 0.070 | 0.000 |
| Cu—V | 0.041 | 0.081 | 0.105 | 0.106 | 0.149 | 0.150 |
| Ni—Si | 0.212 | 0.207 | 0.211 | 0.159 | 0.110 | 0.061 |
| Ni—Mg | 0.255 | 0.291 | 0.302 | 0.220 | 0.201 | 0.166 |
| Ni—C | 0.170 | 0.152 | 0.197 | 0.175 | 0.128 | 0.000 |
| Ni—B | 0.210 | 0.208 | 0.214 | 0.185 | 0.120 | 0.025 |
| Ni—B4C | 0.201 | 0.195 | 0.207 | 0.180 | 0.217 | 0.166 |
| Ni—Ti | 0.088 | 0.121 | 0.148 | 0.152 | 0.191 | 0.166 |
| Ni—V | 0.055 | 0.092 | 0.114 | 0.119 | 0.070 | 0.020 |
| Mn—Si | 0.200 | 0.131 | 0.117 | 0.140 | 0.084 | 0.013 |
| Mn—Mg | 0.216 | 0.201 | 0.197 | 0.223 | 0.109 | 0.000 |
| Mn—C | 0.170 | 0.093 | 0.146 | 0.187 | 0.451 | 0.408 |
| Mn—B | 0.195 | 0.129 | 0.116 | 0.188 | 0.474 | 0.500 |
| Mn—B4C | 0.189 | 0.120 | 0.115 | 0.182 | 0.142 | 0.000 |
| Mn—Ti | 0.097 | 0.109 | 0.130 | 0.155 | 0.095 | 0.000 |
| Mn—V | 0.061 | 0.081 | 0.095 | 0.107 | 0.159 | 0.150 |

TABLE 8C

| Element Pairs: | 22 | 23 | 24 | 25 | 26 | 27 |
|---|---|---|---|---|---|---|
| | \multicolumn{6}{c}{(absolute difference of deltas)/(sum of betas) Normalized in each Wavelength Range:} | | | | | |
| | 1 | 2 | 3 | 4 | 5 | 6 |
| Ti—Si | 0.199 | 0.076 | 0.034 | 0.028 | 0.021 | 0.513 |
| Ti—Mg | 0.244 | 0.097 | 0.048 | 0.036 | 0.036 | 0.500 |

TABLE 8C-continued

| Element Pairs: | 22 | 23 | 24 | 25 | 26 | 27 |
|---|---|---|---|---|---|---|
| | (absolute difference of deltas)/(sum of betas) Normalized in each Wavelength Range: | | | | | |
| | 1 | 2 | 3 | 4 | 5 | 6 |
| Ti—C | 0.123 | 0.055 | 0.114 | 0.122 | 0.408 | 0.908 |
| Ti—B | 0.187 | 0.077 | 0.038 | 0.112 | 0.452 | 1.000 |
| Ti—B4C | 0.173 | 0.072 | 0.043 | 0.102 | 0.107 | 0.500 |
| Ti—V | 0.048 | 0.053 | 0.062 | 0.073 | 0.144 | 0.650 |
| | | | | | | 0.000 |
| V—Si | 0.219 | 0.082 | 0.047 | 0.048 | 0.083 | |
| V—Mg | 0.248 | 0.123 | 0.091 | 0.090 | 0.170 | 0.650 |
| V—C | 0.162 | 0.061 | 0.118 | 0.140 | 0.184 | 0.527 |
| V—B | 0.211 | 0.079 | 0.046 | 0.117 | 0.138 | 0.508 |
| V—B4C | 0.201 | 0.075 | 0.052 | 0.112 | 0.227 | 0.650 |
| V—Ti | 0.048 | 0.053 | 0.062 | 0.073 | 0.144 | 0.650 |
| | | | | | | 0.000 |
| Fe—Si | 0.179 | 0.129 | 0.119 | 0.135 | 0.103 | 0.054 |
| Fe—Mg | 0.218 | 0.219 | 0.217 | 0.211 | 0.148 | |
| Fe—C | 0.156 | 0.098 | 0.145 | 0.169 | 0.170 | 0.028 |
| Fe—B | 0.171 | 0.124 | 0.115 | 0.173 | 0.131 | 0.019 |
| Fe—B4C | 0.165 | 0.115 | 0.113 | 0.187 | 0.172 | 0.080 |
| Fe—Ti | 0.090 | 0.109 | 0.130 | 0.142 | 0.134 | 0.080 |
| Fe—V | 0.057 | 0.083 | 0.098 | 0.099 | 0.058 | 0.012 |

TABLE 9A

| Element Pairs: | 28 | 29 | 30 | 31 | 32 | 33 |
|---|---|---|---|---|---|---|
| | Partial score in each Wavelength Range: ((diff. of deltas)/(sum of betas))/(Chemical Stability) in Wavelength Ranges: | | | | | |
| | 1 | 2 | 3 | 4 | 5 | 6 |
| Hf—Si | 0.381 | 0.333 | 0.309 | 0.296 | 0.297 | 0.547 |
| Hf—Mg | 0.549 | 0.503 | 0.476 | 0.459 | 0.463 | 0.713 |
| Hf—C | 0.100 | 0.062 | 0.052 | 0.041 | 0.040 | 0.273 |
| Hf—B | 0.200 | 0.154 | 0.131 | 0.127 | 0.119 | 0.350 |
| Hf—B4C | 0.180 | 0.136 | 0.115 | 0.110 | 0.124 | 0.366 |
| Hf—Ti | 0.459 | 0.456 | 0.449 | 0.442 | 0.452 | 0.366 |
| Hf—V | 0.371 | 0.379 | 0.375 | 0.373 | 0.361 | 0.606 |
| Ta—Si | 0.473 | 0.419 | 0.394 | 0.380 | 0.366 | 0.607 |
| Ta—Mg | 0.575 | 0.524 | 0.497 | 0.480 | 0.458 | 0.693 |
| Ta—C | 0.196 | 0.150 | 0.135 | 0.124 | 0.248 | 0.546 |
| Ta—B | 0.293 | 0.241 | 0.216 | 0.210 | 0.362 | 0.674 |
| Ta—B4C | 0.274 | 0.222 | 0.200 | 0.193 | 0.178 | 0.407 |
| Ta—Ti | 0.552 | 0.536 | 0.526 | 0.518 | 0.500 | 0.741 |
| Ta—V | 0.473 | 0.468 | 0.460 | 0.454 | 0.487 | 0.757 |
| W—Si | 0.527 | 0.469 | 0.444 | 0.429 | 0.415 | 0.655 |
| W—Mg | 0.556 | 0.501 | 0.474 | 0.457 | 0.435 | 0.670 |
| W—C | 0.254 | 0.202 | 0.186 | 0.174 | 0.296 | 0.594 |
| W—B | 0.348 | 0.291 | 0.266 | 0.259 | 0.410 | 0.722 |
| W—B4C | 0.329 | 0.273 | 0.250 | 0.242 | 0.226 | 0.455 |
| W—Ti | 0.527 | 0.502 | 0.490 | 0.481 | 0.463 | 0.703 |
| W—V | 0.510 | 0.497 | 0.487 | 0.478 | 0.510 | 0.780 |
| Re—Si | 0.543 | 0.479 | 0.452 | 0.438 | 0.423 | 0.660 |
| Re—Mg | 0.535 | 0.474 | 0.446 | 0.431 | 0.408 | 0.640 |
| Re—C | 0.297 | 0.237 | 0.219 | 0.209 | 0.330 | 0.625 |
| Re—B | 0.390 | 0.326 | 0.300 | 0.294 | 0.444 | 0.752 |
| Re—B4C | 0.371 | 0.309 | 0.284 | 0.277 | 0.261 | 0.486 |
| Re—Ti | 0.511 | 0.477 | 0.463 | 0.455 | 0.436 | 0.672 |
| Re—V | 0.504 | 0.481 | 0.470 | 0.461 | 0.492 | 0.759 |
| Pt—Si | 0.478 | 0.420 | 0.396 | 0.385 | 0.374 | 0.616 |
| Pt—Mg | 0.479 | 0.423 | 0.399 | 0.386 | 0.368 | 0.605 |
| Pt—C | 0.311 | 0.257 | 0.242 | 0.233 | 0.358 | 0.657 |
| Pt—B | 0.351 | 0.293 | 0.270 | 0.268 | 0.423 | 0.734 |
| Pt—B4C | 0.358 | 0.301 | 0.279 | 0.276 | 0.264 | 0.493 |
| Pt—Ti | 0.467 | 0.434 | 0.421 | 0.413 | 0.398 | 0.640 |
| Pt—V | 0.451 | 0.428 | 0.416 | 0.408 | 0.443 | 0.715 |
| Nb—Si | 0.531 | 0.450 | 0.421 | 0.412 | 0.406 | 0.646 |
| Nb—Mg | 0.559 | 0.482 | 0.445 | 0.434 | 0.418 | 0.655 |
| Nb—C | 0.244 | 0.177 | 0.158 | 0.161 | 0.294 | 0.584 |
| Nb—B | 0.350 | 0.271 | 0.243 | 0.286 | 0.461 | 0.712 |
| Nb—B4C | 0.329 | 0.252 | 0.223 | 0.258 | 0.263 | 0.446 |
| Nb—Ti | 0.503 | 0.483 | 0.475 | 0.473 | 0.462 | 0.703 |
| Nb—V | 0.443 | 0.440 | 0.442 | 0.443 | 0.486 | 0.745 |

TABLE 9B

| Element Pairs: | 28 | 29 | 30 | 31 | 32 | 33 |
|---|---|---|---|---|---|---|
| | Partial score in each Wavelength Range: ((diff. of deltas)/(sum of betas))/(Chemical Stability) in Wavelength Ranges: | | | | | |
| | 1 | 2 | 3 | 4 | 5 | 6 |
| Mo—Si | 0.559 | 0.474 | 0.444 | 0.437 | 0.467 | 0.721 |
| Mo—Mg | 0.564 | 0.484 | 0.446 | 0.441 | 0.579 | 0.886 |
| Mo—C | 0.278 | 0.205 | 0.185 | 0.197 | 0.239 | 0.467 |
| Mo—B | 0.379 | 0.296 | 0.265 | 0.320 | 0.362 | 0.532 |
| Mo—B4C | 0.359 | 0.278 | 0.247 | 0.291 | 0.451 | 0.697 |
| Mo—Ti | 0.505 | 0.474 | 0.462 | 0.464 | 0.606 | 0.916 |
| Mo—V | 0.485 | 0.470 | 0.467 | 0.461 | 0.465 | 0.713 |
| Cr—Si | 0.551 | 0.498 | 0.487 | 0.493 | 0.478 | 0.448 |
| Cr—Mg | 0.498 | 0.473 | 0.466 | 0.474 | 0.430 | 0.380 |
| Cr—C | 0.270 | 0.218 | 0.246 | 0.264 | 0.409 | 0.386 |
| Cr—B | 0.370 | 0.318 | 0.308 | 0.342 | 0.501 | 0.514 |
| Cr—B4C | 0.350 | 0.297 | 0.292 | 0.323 | 0.317 | 0.248 |
| Cr—Ti | 0.451 | 0.454 | 0.463 | 0.476 | 0.452 | 0.411 |
| Cr—V | 0.498 | 0.506 | 0.511 | 0.517 | 0.549 | 0.553 |
| Co—Si | 0.579 | 0.567 | 0.566 | 0.548 | 0.510 | 0.477 |
| Co—Mg | 0.481 | 0.492 | 0.494 | 0.462 | 0.398 | 0.350 |
| Co—C | 0.297 | 0.280 | 0.302 | 0.301 | 0.417 | 0.416 |
| Co—B | 0.400 | 0.390 | 0.389 | 0.387 | 0.516 | 0.544 |
| Co—B4C | 0.379 | 0.367 | 0.370 | 0.367 | 0.334 | 0.277 |
| Co—Ti | 0.426 | 0.439 | 0.450 | 0.458 | 0.423 | 0.381 |
| Co—V | 0.475 | 0.491 | 0.500 | 0.506 | 0.527 | 0.523 |
| Cu—Si | 0.544 | 0.544 | 0.547 | 0.520 | 0.485 | 0.456 |
| Cu—Mg | 0.460 | 0.476 | 0.483 | 0.441 | 0.385 | 0.345 |
| Cu—C | 0.291 | 0.286 | 0.308 | 0.295 | 0.410 | 0.421 |
| Cu—B | 0.391 | 0.393 | 0.397 | 0.379 | 0.510 | 0.549 |
| Cu—B4C | 0.371 | 0.370 | 0.377 | 0.361 | 0.328 | 0.282 |
| Cu—Ti | 0.412 | 0.430 | 0.444 | 0.443 | 0.411 | 0.376 |
| Cu—V | 0.463 | 0.483 | 0.495 | 0.495 | 0.517 | 0.518 |
| Ni—Si | 0.581 | 0.579 | 0.581 | 0.555 | 0.530 | 0.506 |
| Ni—Mg | 0.473 | 0.491 | 0.497 | 0.455 | 0.446 | 0.429 |
| Ni—C | 0.301 | 0.293 | 0.315 | 0.304 | 0.281 | 0.217 |
| Ni—B | 0.403 | 0.402 | 0.405 | 0.390 | 0.358 | 0.310 |
| Ni—B4C | 0.382 | 0.379 | 0.385 | 0.372 | 0.390 | 0.365 |
| Ni—Ti | 0.420 | 0.437 | 0.450 | 0.452 | 0.471 | 0.459 |
| Ni—V | 0.471 | 0.490 | 0.500 | 0.503 | 0.479 | 0.454 |
| Mn—Si | 0.507 | 0.472 | 0.465 | 0.476 | 0.448 | 0.413 |
| Mn—Mg | 0.522 | 0.515 | 0.512 | 0.526 | 0.468 | 0.414 |
| Mn—C | 0.232 | 0.194 | 0.220 | 0.241 | 0.373 | 0.352 |
| Mn—B | 0.327 | 0.294 | 0.287 | 0.324 | 0.467 | 0.480 |
| Mn—B4C | 0.308 | 0.273 | 0.271 | 0.304 | 0.284 | 0.213 |
| Mn—Ti | 0.493 | 0.499 | 0.510 | 0.522 | 0.492 | 0.445 |
| Mn—V | 0.493 | 0.503 | 0.511 | 0.517 | 0.543 | 0.538 |

TABLE 9C

| Element Pairs: | 28 | 29 | 30 | 31 | 32 | 33 |
|---|---|---|---|---|---|---|
| | Partial score in each Wavelength Range: ((diff. of deltas)/(sum of betas))/(Chemical Stability) in Wavelength Ranges: | | | | | |
| | 1 | 2 | 3 | 4 | 5 | 6 |
| Ti—Si | 0.451 | 0.390 | 0.368 | 0.365 | 0.362 | 0.608 |
| Ti—Mg | 0.556 | 0.482 | 0.458 | 0.452 | 0.451 | 0.684 |
| Ti—C | 0.154 | 0.120 | 0.150 | 0.154 | 0.297 | 0.547 |
| Ti—B | 0.268 | 0.213 | 0.193 | 0.230 | 0.400 | 0.674 |
| Ti—B4C | 0.245 | 0.194 | 0.179 | 0.209 | 0.211 | 0.408 |
| Ti—V | 0.457 | 0.460 | 0.464 | 0.470 | 0.505 | 0.758 |
| | 0.000 | 0.000 | 0.000 | 0.000 | 0.000 | 0.000 |
| V—Si | | | | | | |
| V—Mg | 0.527 | 0.464 | 0.448 | 0.448 | 0.487 | 0.728 |
| V—C | 0.240 | 0.190 | 0.219 | 0.230 | 0.252 | 0.423 |
| V—B | 0.346 | 0.280 | 0.264 | 0.300 | 0.310 | 0.495 |
| V—B4C | 0.325 | 0.262 | 0.251 | 0.281 | 0.339 | 0.550 |
| V—Ti | 0.457 | 0.460 | 0.464 | 0.470 | 0.505 | 0.758 |
| | 0.000 | 0.000 | 0.000 | 0.000 | 0.000 | 0.000 |
| Fe—Si | 0.561 | 0.536 | 0.531 | 0.539 | 0.523 | 0.499 |
| Fe—Mg | | | | | | |
| Fe—C | 0.290 | 0.262 | 0.285 | 0.297 | 0.297 | 0.227 |
| Fe—B | 0.379 | 0.356 | 0.352 | 0.380 | 0.359 | 0.304 |
| Fe—B4C | 0.360 | 0.335 | 0.334 | 0.361 | 0.364 | 0.318 |
| Fe—Ti | 0.425 | 0.435 | 0.445 | 0.451 | 0.447 | 0.420 |
| Fe—V | 0.475 | 0.489 | 0.496 | 0.497 | 0.476 | 0.453 |

TABLE 10A

Overall score in each Wavelength Range: (Partial score * Fluorescences) in Wavelength Ranges

| Element Pairs: | 34 (1) | 35 (2) | 36 (3) | 37 (4) | 38 (5) | 39 (6) |
|---|---|---|---|---|---|---|
| Hf—Si | 0.381 | 0.333 | 0.309 | 0.296 | 0.297 | 0.547 |
| Hf—Mg | 0.549 | 0.503 | 0.476 | 0.459 | 0.463 | 0.713 |
| Hf—C | 0.100 | 0.062 | 0.000 | 0.000 | 0.040 | 0.273 |
| Hf—B | 0.200 | 0.154 | 0.131 | 0.000 | 0.000 | 0.350 |
| Hf—B4C | 0.180 | 0.136 | 0.000 | 0.000 | 0.000 | 0.366 |
| Hf—Ti | 0.459 | 0.000 | 0.000 | 0.000 | 0.452 | 0.708 |
| Hf—V | 0.371 | 0.000 | 0.000 | 0.000 | 0.361 | 0.606 |
| Ta—Si | 0.473 | 0.419 | 0.394 | 0.380 | 0.366 | 0.607 |
| Ta—Mg | 0.575 | 0.524 | 0.497 | 0.480 | 0.458 | 0.693 |
| Ta—C | 0.196 | 0.150 | 0.000 | 0.000 | 0.248 | 0.546 |
| Ta—B | 0.293 | 0.241 | 0.216 | 0.000 | 0.000 | 0.674 |
| Ta—B4C | 0.274 | 0.222 | 0.000 | 0.000 | 0.000 | 0.407 |
| Ta—Ti | 0.552 | 0.000 | 0.000 | 0.000 | 0.500 | 0.741 |
| Ta—V | 0.473 | 0.000 | 0.000 | 0.000 | 0.487 | 0.757 |
| W—Si | 0.527 | 0.469 | 0.444 | 0.429 | 0.415 | 0.655 |
| W—Mg | 0.556 | 0.501 | 0.474 | 0.457 | 0.435 | 0.670 |
| W—C | 0.254 | 0.202 | 0.000 | 0.000 | 0.296 | 0.594 |
| W—B | 0.348 | 0.291 | 0.266 | 0.000 | 0.410 | 0.722 |
| W—B4C | 0.329 | 0.273 | 0.000 | 0.000 | 0.000 | 0.455 |
| W—Ti | 0.527 | 0.000 | 0.000 | 0.000 | 0.463 | ERR |
| W—V | 0.510 | 0.000 | 0.000 | 0.000 | 0.510 | 0.780 |
| Re—Si | 0.543 | 0.479 | 0.452 | 0.438 | 0.423 | 0.660 |
| Re—Mg | 0.535 | 0.474 | 0.446 | 0.431 | 0.408 | 0.640 |
| Re—C | 0.297 | 0.237 | 0.000 | 0.000 | 0.330 | 0.625 |
| Re—B | 0.390 | 0.326 | 0.300 | 0.000 | 0.000 | 0.752 |
| Re—B4C | 0.371 | 0.309 | 0.000 | 0.000 | 0.000 | 0.486 |
| Re—Ti | 0.511 | 0.000 | 0.000 | 0.000 | ERR | 0.000 |
| Re—V | 0.504 | 0.000 | 0.000 | 0.000 | ERR | 0.000 |
| Pt—Si | 0.478 | 0.420 | 0.396 | 0.385 | 0.374 | 0.616 |
| Pt—Mg | 0.479 | 0.423 | 0.399 | 0.386 | 0.368 | 0.605 |
| Pt—C | 0.311 | 0.257 | 0.000 | 0.000 | 0.358 | 0.657 |
| Pt—B | 0.351 | 0.293 | 0.270 | 0.000 | 0.000 | 0.734 |
| Pt—B4C | 0.358 | 0.301 | 0.000 | 0.000 | 0.000 | 0.493 |
| Pt—Ti | 0.467 | 0.000 | 0.000 | 0.000 | 0.398 | 0.640 |
| Pt—V | 0.451 | 0.000 | 0.000 | 0.000 | 0.443 | 0.715 |
| Nb—Si | 0.531 | 0.450 | 0.421 | 0.000 | 0.406 | 0.646 |
| Nb—Mg | 0.559 | 0.482 | 0.445 | 0.000 | 0.418 | 0.655 |
| Nb—C | 0.244 | 0.177 | 0.000 | 0.000 | 0.000 | 0.584 |
| Nb—B | 0.350 | 0.271 | 0.243 | 0.000 | 0.000 | 0.712 |
| Nb—B4C | 0.329 | 0.252 | 0.000 | 0.000 | 0.000 | 0.446 |
| Nb—Ti | 0.503 | 0.000 | 0.000 | 0.000 | 0.000 | 0.703 |
| Nb—V | 0.443 | 0.000 | 0.000 | 0.000 | 0.486 | 0.745 |

TABLE 10B

Overall score in each Wavelength Range: (Partial score * Fluorescences) in Wavelength Ranges

| Element Pairs: | 34 (1) | 35 (2) | 36 (3) | 37 (4) | 38 (5) | 39 (6) |
|---|---|---|---|---|---|---|
| Mo—Si | 0.559 | 0.474 | 0.444 | 0.000 | 0.467 | 0.721 |
| Mo—Mg | 0.564 | 0.484 | 0.446 | 0.000 | 0.000 | 0.886 |
| Mo—C | 0.278 | 0.205 | 0.000 | 0.000 | 0.000 | 0.467 |
| Mo—B | 0.379 | 0.296 | 0.265 | 0.000 | 0.000 | 0.532 |
| Mo—B4C | 0.359 | 0.278 | 0.000 | 0.000 | 0.000 | 0.697 |
| Mo—Ti | 0.505 | 0.000 | 0.000 | 0.000 | 0.000 | 0.916 |
| Mo—V | 0.485 | 0.000 | 0.000 | 0.000 | 0.000 | 0.713 |
| Cr—Si | 0.000 | 0.000 | 0.000 | 0.493 | 0.478 | 0.448 |
| Cr—Mg | 0.000 | 0.000 | 0.000 | 0.474 | 0.430 | 0.380 |
| Cr—C | 0.000 | 0.000 | 0.000 | 0.000 | 0.409 | 0.386 |
| Cr—B | 0.000 | 0.000 | 0.000 | 0.000 | 0.000 | 0.514 |
| Cr—B4C | 0.000 | 0.000 | 0.000 | 0.000 | 0.000 | 0.248 |
| Cr—Ti | 0.000 | 0.000 | 0.000 | 0.000 | 0.452 | 0.411 |
| Cr—V | 0.000 | 0.000 | 0.000 | 0.000 | 0.549 | 0.553 |
| Co—Si | 0.000 | 0.000 | 0.000 | 0.548 | 0.510 | 0.477 |
| Co—Mg | 0.000 | 0.000 | 0.000 | 0.462 | 0.398 | 0.350 |
| Co—C | 0.000 | 0.000 | 0.000 | 0.000 | 0.417 | 0.416 |
| Co—B | 0.000 | 0.000 | 0.000 | 0.000 | 0.000 | 0.544 |
| Co—B4C | 0.000 | 0.000 | 0.000 | 0.000 | 0.000 | 0.277 |
| Co—Ti | 0.000 | 0.000 | 0.000 | 0.000 | 0.423 | 0.381 |
| Co—V | 0.000 | 0.000 | 0.000 | 0.000 | 0.527 | 0.523 |
| Cu—Si | 0.000 | 0.000 | 0.000 | 0.520 | 0.485 | 0.456 |
| Cu—Mg | 0.000 | 0.000 | 0.000 | 0.441 | 0.385 | 0.345 |
| Cu—C | 0.000 | 0.000 | 0.000 | 0.000 | 0.410 | 0.421 |
| Cu—B | 0.000 | 0.000 | 0.000 | 0.000 | 0.000 | 0.549 |

TABLE 10B-continued

Overall score in each Wavelength Range: (Partial score * Fluorescences) in Wavelength Ranges

| Element Pairs: | 34 (1) | 35 (2) | 36 (3) | 37 (4) | 38 (5) | 39 (6) |
|---|---|---|---|---|---|---|
| Cu—B4C | 0.000 | 0.000 | 0.000 | 0.000 | 0.000 | 0.282 |
| Cu—Ti | 0.000 | 0.000 | 0.000 | 0.000 | 0.411 | 0.376 |
| Cu—V | 0.000 | 0.000 | 0.000 | 0.000 | 0.517 | 0.518 |
| Ni—Si | 0.000 | 0.000 | 0.000 | 0.555 | 0.530 | 0.506 |
| Ni—Mg | 0.000 | 0.000 | 0.000 | 0.455 | 0.446 | 0.429 |
| Ni—C | 0.000 | 0.000 | 0.000 | 0.000 | 0.281 | 0.217 |
| Ni—B | 0.000 | 0.000 | 0.000 | 0.000 | 0.000 | 0.310 |
| Ni—B4C | 0.000 | 0.000 | 0.000 | 0.000 | 0.000 | 0.365 |
| Ni—Ti | 0.000 | 0.000 | 0.000 | 0.000 | 0.471 | 0.459 |
| Ni—V | 0.000 | 0.000 | 0.000 | 0.000 | 0.479 | 0.454 |
| Mn—Si | 0.000 | 0.000 | 0.000 | 0.476 | 0.448 | 0.413 |
| Mn—Mg | 0.000 | 0.000 | 0.000 | 0.526 | 0.468 | 0.414 |
| Mn—C | 0.000 | 0.000 | 0.000 | 0.000 | 0.373 | 0.352 |
| Mn—B | 0.000 | 0.000 | 0.000 | 0.000 | 0.000 | 0.480 |
| Mn—B4C | 0.000 | 0.000 | 0.000 | 0.000 | 0.000 | 0.213 |
| Mn—Ti | 0.000 | 0.000 | 0.000 | 0.000 | 0.492 | 0.445 |
| Mn—V | 0.000 | 0.000 | 0.000 | 0.000 | 0.543 | 0.538 |

TABLE 10C

Overall score in each Wavelength Range: (Partial score * Fluorescences) in Wavelength Ranges

| Element Pairs: | 34 (1) | 35 (2) | 36 (3) | 37 (4) | 38 (5) | 39 (6) |
|---|---|---|---|---|---|---|
| Ti—Si | 0.451 | 0.000 | 0.000 | 0.000 | 0.362 | 0.608 |
| Ti—Mg | 0.556 | 0.000 | 0.000 | 0.000 | 0.451 | 0.684 |
| Ti—C | 0.154 | 0.000 | 0.000 | 0.000 | 0.297 | 0.547 |
| Ti—B | 0.268 | 0.000 | 0.000 | 0.000 | 0.000 | 0.674 |
| Ti—B4C | 0.245 | 0.000 | 0.000 | 0.000 | 0.000 | 0.408 |
| Ti—V | 0.457 | 0.000 | 0.000 | 0.000 | 0.505 | 0.758 |
| V—Si | 0.000 | 0.000 | 0.000 | 0.000 | 0.000 | 0.000 |
| V—Mg | 0.527 | 0.000 | 0.000 | 0.000 | 0.487 | 0.728 |
| V—C | 0.240 | 0.000 | 0.000 | 0.000 | 0.252 | 0.423 |
| V—B | 0.346 | 0.000 | 0.000 | 0.000 | 0.000 | 0.495 |
| V—B4C | 0.325 | 0.000 | 0.000 | 0.000 | 0.000 | 0.550 |
| V—Ti | 0.457 | 0.000 | 0.000 | 0.000 | 0.505 | 0.758 |
| Fe—Si | 0.000 | 0.000 | 0.000 | 0.000 | 0.523 | 0.499 |
| Fe—Mg | 0.000 | 0.000 | 0.000 | 0.000 | 0.000 | 0.000 |
| Fe—C | 0.000 | 0.000 | 0.000 | 0.000 | 0.297 | 0.227 |
| Fe—B | 0.000 | 0.000 | 0.000 | 0.000 | 0.000 | 0.304 |
| Fe—B4C | 0.000 | 0.000 | 0.000 | 0.000 | 0.000 | 0.318 |
| Fe—Ti | 0.000 | 0.000 | 0.000 | 0.000 | 0.447 | 0.420 |
| Fe—V | 0.000 | 0.000 | 0.000 | 0.000 | 0.476 | 0.453 |

For devices to be used in the harder X-ray region this same analysis must be carried out, but with different fluorescence limitations on the X-ray structures.

We have found that particularly good stability results are obtained if the Pauling electronegativity difference between the members of the layer pair is less than 1.0 volts, the atomic radius difference is less than 1.00 Angstroms, and the bond length difference is less than 1.60 Angstroms.

Values for the atomic scattering factor, used to calculate electron density, may be found in various books, and journals, including, e.g., B. L. Henke, P. Lee, T. J. Tanaka, R. L. Shimakuburo, and B. K. Fujikawa, *Low Energy X-Ray Interaction Coefficients: Photoabsorption, Scattering, and Reflection*, Atomic Data and Nuclear Data Tables, Vol. 27, pages 1-144 (1982). The Pauling Electronegativities are tabulated in FIG. 12. The Atomic Radii are tabulated in FIG. 13. The Bond Lengths are tabulated in FIG. 14.

One example of a specific Langmuir-Blodgett X-ray film which can be replaced by the structures of the present invention is a Myristate film. The structure in accordance with the present invention was formed from 50 layer pairs of Hf and Si by magnetron sputtering at room temperature in argon with 2 microns background pressure. The nominal composition was about $Si_{60}Hf_{40}$. The comparison for O K$\alpha$ and N K$\alpha$ reflections are shown in Table 1.

TABLE 1

| Hf:Si Structure $I_p$ | | Myristate $I_p$ |
|---|---|---|
| O | $1.24 \times 10^5$ | $3.38 \times 10^4$ |
| N | $1.16 \times 10^4$ | $2.36 \times 10^3$ |

The present structure was more than 3.6 times better than the Myristate for O K$\alpha$ and more than 4.9 times better than the Myristate for N K$\alpha$ detection. These measurements were made in a JEOL WDS Spectrometer by standard techniques under substantially identical operating conditions for each test. The Hf:Si structure had a d spacing of 42 Å and the Myristate had a d spacing of 40 Å. Part of the large difference is due to the lack of the C absorption edge in the Hf:Si structure. The Hf:Si structure exhibits a substantially constant reflectivity over the soft X-ray range of interest. The prior structures, both LB and lsm structures which include C, in contrast fall below one third of the theoretical intensity at the C absorption edge at approximately 43.7 Å. Significant changes in the reflection intensity have been observed by annealing the structures for times as short as one hour at 100° C.

The structures of the present invention also can be thermally activated to control various desired parameters in the resulting structures. An increase in first order reflectivities can be obtained by post annealing the structures. A Hf:Si structure was deposited in a magnetron sputtering system in argon with 2 micron background pressure at room temperature. The structure had a nominal composition of $Hf_{40}Si_{60}$, 100 layer pairs and a d spacing of 34.4 Å. The deposited structure was annealed at 200° C. for sixty-three hours which increased the reflection intensity ($I_r/I_i$) in the first three orders of reflection as shown in Table 2.

TABLE 2

|  | 1st order | 2nd order | 3rd order |
|---|---|---|---|
| As deposited | 70.5 | .40 | .06 |
| After annealing | 72.5 | .44 | .41 |

A second method of tuning the reflectivity is illustrated in Table 3. These were all Hf:Si structures deposited in the magnetron sputtering system under the same general conditions as previously described, with the exception that the substrate temperature was varied as described. The structures again had a nominal composition of $Hf_{40}Si_{60}$, 100 layer pairs and a d spacing of 38.8 Å.

TABLE 3

| Substrate Temperature | First Order Reflectivity |
|---|---|
| 50° C. | 53.7 |
| 100° C. | 75.7 |
| 200° C. | 70.0 |

Table 4 illustrates the use of thermal activation to decrease the first order reflection and to increase the second order reflection. This principle can be utilized for structures where the first order is reflected at too small an angle to be effective. The Hf:Si materials were deposited in the magnetron sputtering system under the previously described conditions at room temperature. Both structures had a nominal composition of $Hf_{40}Si_{60}$ and 100 layer pairs. The first had a deposited d spacing of 32.13 Å and the second a d spacing of 33.21 Å. The first structure was annealed at 300° C. for 1 hour and the second at 400° C. for 1 hour.

TABLE 4

|  | First Order | Second Order |
|---|---|---|
| #1 Before Anneal | 77.8 | .28 |
| After Anneal | 13.8 | .60 |
| #2 Before Anneal | 56.0 | .26 |
| After Anneal | 49.6 | 1.10 |

Many modifications and variations of the present invention are possible in light of the above teachings. While the utilization in the layered structures of C, W and Be as well as other elements as major constituents, produce undesirable absorption edges and/or fluorescence, small amounts of the materials can be useful. The addition of small amounts of C, W or Be such as in Hf:Si-C structures or W-Re-Hf:Si-C structures can be useful, because reflectivity increases as the electron density difference increases. The C or Be would replace some of the Si while the W will replace some of the Re-Hf alloy. This can result in at least two desirable effects, one is an increase in intensity at wavelengths of interest away from the absorption or fluorescense edges and a second by increasing the overall stability of the structures.

Other material combinations can be formed within the scope of the invention, including alloy: alloy layer pairs, alloy:Si or alloy:Si:H layer pairs, Hf-Re:Si layer pairs or Hf-Re:Si-H alloy pairs. Also, the ion beam or sputtering flux can be profiled to control the uniformity of the deposited structure over the substrate area. This allows the construction of structures whose d spacing can be varied in a controlled fashion across the surface of the substrate and subsequent layers. The type of substrate is not critical and can include any prior lsm type of substrate, including polished silicon wafers, glass, metal, quartz, sapphire or flexible plastic. It is, therefore, to be understood that within the scope of the appended claims, the invention may be practiced otherwise than as specifically described.

What is claimed and desired to be secured by Letters Patent of the United States is:

1. An X-ray dispersive structure having high reflectivity within a wavelength range of interest within a range of 8.34 Angstroms to 120 Angstroms, said structure comprising a plurality of sputter deposited substantially amorphous layer pairs formed on one another on a substrate, each layer pair consisting of a different material, the said two said different materials being characterized by chemically stable interfaces with the materials of the layer pair having:

(1) a Pauling electronegativity difference therebetween less than 1.0 volts;

(2) a covalent radius difference therebetween less than 1.00 Angstroms; and (3) a bond length difference therebetween less than 1.60 Angstroms;

said layers having an interface roughness of less than 1.40 Angstroms therebetween; the adsorption edges and fluorescence of the materials of the structure being outside the wavelength range of interest and the individual layers and layer pairs having a constant d spacing as a function of thickness through the dispersive structure.

2. The X-ray dispersive structure of claim 1 wherein the wavelength range of interest is from 8.34 Angstroms to 18.3 Angstroms for the detection of one of aluminum, magnesium, sodium, and fluorine, and the layer pair is chosen from the group consisting of Ta:Mg, Ta:Ti; W:Si; W:Mg, W:Ti; W:V; Re:Si; Re:Mg; Re:Ti; Re:V; Nb:Si; Nb:Mg; Nb:Ti; Mo:Si; Mo:Mg; Mo:Ti; and Mo:Mg.

3. The X-ray dispersive structure of claim 1 wherein the wavelength range of interest is from 11.91 Angstroms to 31.6 Angstroms for the detection of one of sodium, fluorine, oxygen, and nitrogen, and the layer pair is chosen from the group consisting of (a) a metal chosen from the group consisting of Hf, Ta, W, Re, Pt, and Nb; and (b) a light component chosen from the group consisting of Si, Mg, C, B, and $B_4C$.

4. The X-ray dispersive structure of claim 1 wherein the wavelength range of interest is from 18.3 Angstroms to 44.7 Angstroms for the detection of one of fluorine, oxygen, nitrogen, and carbon, and the layer pair is chosen from the group consisting of (a) a metal chosen from the group consisting of Hf, Ta, W, Re, Pt, Nb, and Mo; and (b) a light component chosen from the group consisting of Si, Mg, and B.

5. The X-ray dispersive structure of claim 1 wherein the wavelength range of interest is from 23.6 Angstroms to 67.6 Angstroms for the detection of one of oxygen, nitrogen, carbon, and boron, and the layer pair is chosen from the group consisting of (a) a metal chosen from the group consisting of Hf, Ta, W, Re, Pt, Cr, Cu, Ni, and Mn; and (b) a light component chosen from the group consisting of Si and Mg.

6. The X-ray dispersive structure of claim 1 wherein the wavelength range of interest is from 44.7 Angstroms to 118 Angstroms for the detection of one of carbon, boron, and berylium, and the layer pair is chosen from the group consisting of Co:Si; Cu:V; Ni:Si; Mn:V; Ti:V; and Fe:Si.

7. The X-ray dispersive structure of claim 1 wherein the wavelength range of interest is from 67.6 Angstroms to 118 Angstroms for the detection of one of boron and berylium, and the layer pair is chosen from Hf:Mg; Hf:Ti; Ta:Ti; Ta:V; W:B; W:V; Re:B; Pt:B; Pt:V; Nb:B; Nb:Ti; Nb:V; Mo:Si; Mo:Mg; Mo:Ti; Mo:V; Ti:V; and V:Mg.

8. The structure of claim 1 wherein:
said layers are formed of two different materials, one material including at least silicon.

9. The structure of claim 8 wherein:
said second material includes at least hafnium.

10. The structure as defined in claim 1 wherein:
each of said layer pairs is formed of two different materials, one material forming each layer, one material being hafnium and one material being silicon.

11. The structure as defined in claim 1 wherein:
each of said layer pairs is formed of two different materials, one material forming each layer, one material including at least rhenium and one material including at least silicon.

* * * * *